United States Patent
Leiber et al.

(10) Patent No.: US 11,702,052 B2
(45) Date of Patent: Jul. 18, 2023

(54) PISTON-CYLINDER UNITS AND HYDRAULIC DEVICES WITH DIAGNOSIS OR MONITORING FUNCTION OF THE CONTROL AND REGULATING DEVICE

(71) Applicant: IPGATE AG, Pfäffikon (CH)

(72) Inventors: Heinz Leiber, Oberriexingen (DE); Anton Van Zanten, Ditzingen (DE); Thomas Leiber, Rogoznica (HR)

(73) Assignee: IPGATE AG, Pfäffikon (CH)

( * ) Notice: Subject to any disclaimer, the term of this patent is extended or adjusted under 35 U.S.C. 154(b) by 489 days.

(21) Appl. No.: 16/761,236

(22) PCT Filed: Oct. 31, 2018

(86) PCT No.: PCT/EP2018/079791
§ 371 (c)(1),
(2) Date: May 1, 2020

(87) PCT Pub. No.: WO2019/086502
PCT Pub. Date: May 9, 2019

(65) Prior Publication Data
US 2020/0362888 A1    Nov. 19, 2020

(30) Foreign Application Priority Data
Nov. 3, 2017    (DE) ...................... 10 2017 125 696.2

(51) Int. Cl.
*B60T 13/58* (2006.01)
*B60T 11/236* (2006.01)
(Continued)

(52) U.S. Cl.
CPC ............. *B60T 11/236* (2013.01); *B60T 7/042* (2013.01); *B60T 8/1755* (2013.01); *B60T 13/58* (2013.01);
(Continued)

(58) Field of Classification Search
CPC ........ B60T 8/92; B60T 13/662; B60T 11/236; B60T 7/042; B60T 8/1755; B60T 13/58;
(Continued)

(56) References Cited

U.S. PATENT DOCUMENTS 3,829,104 A     8/1974  Green
6,206,484 B1 *  3/2001  Ganzel ..................... H03K 5/08
                                                        303/119.2
(Continued)

FOREIGN PATENT DOCUMENTS

CN    103950444 A    7/2014
CN    105026232 A    11/2015
(Continued)

OTHER PUBLICATIONS

Int'l Search Report dated Mar. 20, 2019 in Int'l Application No. PCT/EP2018/079791.
(Continued)

*Primary Examiner* — Christopher P Schwartz
(74) *Attorney, Agent, or Firm* — Panitch Schwarze Belisario & Nadel LLP

(57) ABSTRACT

A piston-cylinder unit includes a piston delimiting at least one working chamber, in which a first seal for sealing at least one first working chamber is arranged either between the piston and cylinder or between a plunger connected to the piston and the cylinder. A second seal is arranged between the first seal and the first working chamber, and the piston-cylinder unit further includes a first channel arranged in the wall of the cylinder or in the piston, which joins the first seal and the second seal in the inner chamber of the cylinder. The first channel and/or a hydraulic line connected thereto may have a throttle device and/or a valve device. An electronic control and regulating device may have a diagnosis or monitoring function for a possible defect or failure of a seal.

(Continued)

Figure 1:
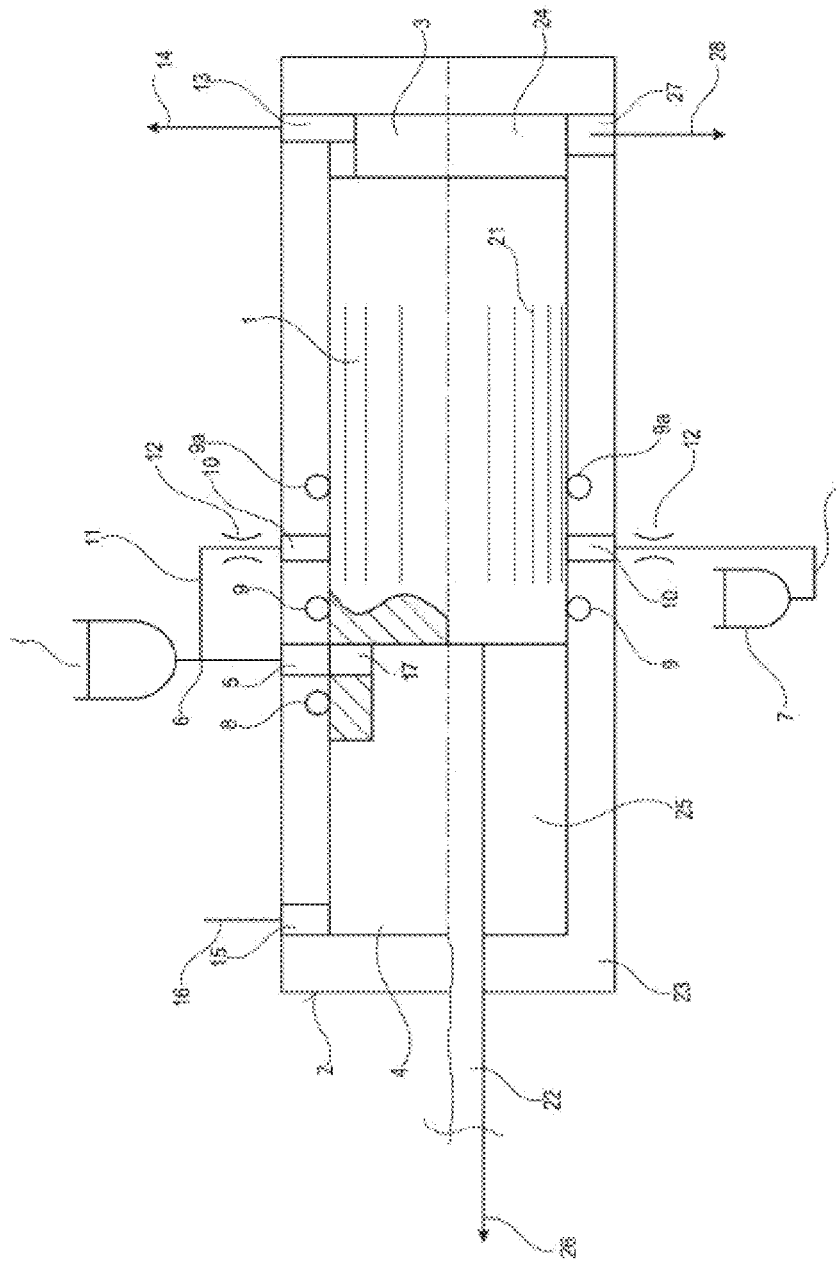

Multiple hydraulic devices may have such piston-cylinder units and respective control and such regulating devices.

26 Claims, 11 Drawing Sheets

(51) Int. Cl.
  *B60T 7/04*      (2006.01)
  *B60T 8/1755*    (2006.01)
  *B60T 13/66*     (2006.01)
  *B60T 15/36*     (2006.01)
  *F15B 13/02*     (2006.01)
  *F15B 19/00*     (2006.01)

(52) U.S. Cl.
  CPC ............ *B60T 13/662* (2013.01); *B60T 15/36* (2013.01); *B60T 2270/306* (2013.01); *B60T 2270/402* (2013.01); *B60T 2270/413* (2013.01); *B60T 2270/82* (2013.01); *F15B 13/02* (2013.01); *F15B 19/005* (2013.01)

(58) Field of Classification Search
  CPC ............... B60T 15/36; B60T 2270/306; B60T 2270/402; B60T 2270/413; B60T 2270/82; F15B 13/02; F15B 19/005
  USPC .............. 303/6.01, 113.1, 114.1, 115.1, 122, 303/122.09, 122.11; 188/322.2, 322.22
  See application file for complete search history.

(56) References Cited

U.S. PATENT DOCUMENTS

| | | | | |
|---|---|---|---|---|
| 10,059,321 | B2 * | 8/2018 | van Zanten | B60T 8/92 |
| 11,104,317 | B2 * | 8/2021 | Leiber | B60T 8/4077 |
| 2010/0066162 | A1 | 3/2010 | Isono | |
| 2014/0265544 | A1 * | 9/2014 | Ganzel | B60T 13/662 |
| | | | | 303/6.01 |
| 2015/0115701 | A1 | 4/2015 | Koo | |
| 2016/0311422 | A1 * | 10/2016 | van Zanten | G01M 3/2869 |
| 2017/0232948 | A1 * | 8/2017 | Leiber | B60T 8/4081 |
| | | | | 303/11 |

FOREIGN PATENT DOCUMENTS

| | | |
|---|---|---|
| CN | 106232441 A | 12/2016 |
| CN | 107010039 A | 8/2017 |
| DE | 1530923 B1 | 1/1970 |
| DE | 2313375 A1 | 9/1974 |
| DE | 10036287 A1 | 2/2002 |
| DE | 102012210809 A1 | 1/2013 |
| DE | 102013216477 A1 | 2/2015 |
| DE | 202015008975 U1 | 6/2016 |
| DE | 102015106089 A1 | 10/2016 |
| DE | 102016220485 A1 | 4/2017 |
| DE | 112015003989 T5 | 5/2017 |
| DE | 102016224057 A1 | 6/2017 |
| DE | 102016224062 A1 | 6/2017 |
| DE | 102016005318 A1 | 11/2017 |
| DE | 102017113563 A1 | 12/2018 |
| EP | 3421312 A1 | 1/2019 |
| FR | 1430484 A | 3/1966 |
| JP | H11157439 A | 6/1999 |
| WO | 2012143175 A2 | 10/2012 |

OTHER PUBLICATIONS

Search Report issued Sep. 24, 2019 in DE Application No. 102017125696.2.
Office Action dated Nov. 30, 2021 in Chinese Application No. 2018800717241 (shown for relevance, no translation).
Office Action dated Mar. 29, 2023 in German Application No. 11 2018 005 270.2 shown for relevance, no translation.

* cited by examiner

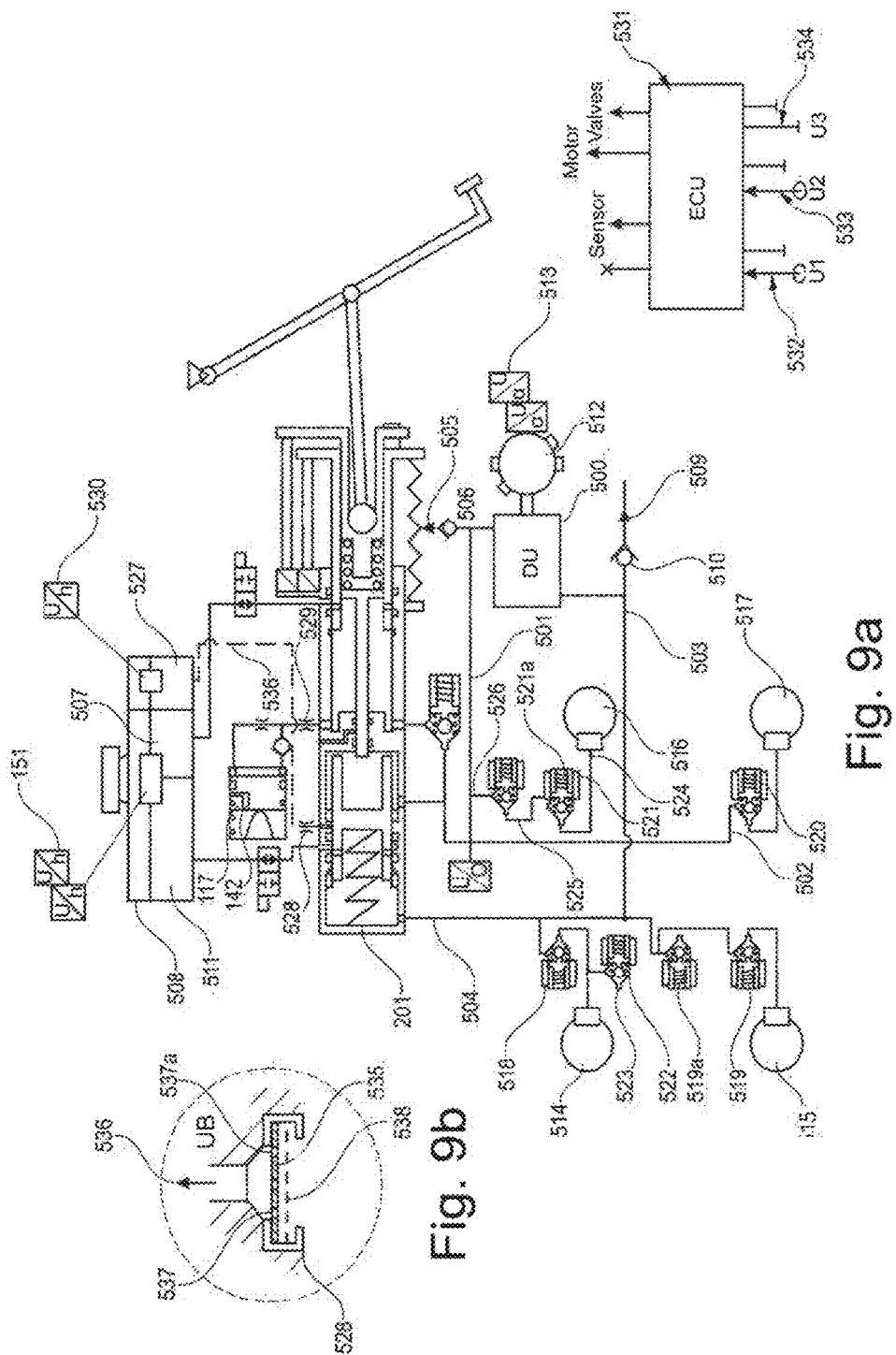

PISTON-CYLINDER UNITS AND HYDRAULIC DEVICES WITH DIAGNOSIS OR MONITORING FUNCTION OF THE CONTROL AND REGULATING DEVICE

CROSS-REFERENCE TO RELATED APPLICATION

This application is a Section 371 of International Application No. PCT/EP2018/079791, filed Oct. 31, 2018, which was published in the German language on May 9, 2019 under International Publication No. WO 2019/086502 A1, which claims priority under 35 U.S.C. § 119(b) to German Patent Application No. 10 2017 125 696.2, filed Nov. 3, 2017, the disclosures of which are incorporated herein by reference.

FIELD

The invention relates to a hydraulic device and a piston-cylinder unit sealing system for such devices, in particular for brake and clutch devices for automated driving, and their components.

BACKGROUND OF THE ART

Hydraulic devices and piston-cylinder units of the type mentioned are known.

For example, a brake system is already known from DE 11 2015 00 39 89 in which the use of a second seal is provided for higher requirements, as a result of which the failure probability becomes significantly smaller, but not zero. Here, the ball screw drive (KGT) and the motor of the brake device are protected against the ingress of brake fluid by the second seal.

In connection with the introduction of automated driving, however, the requirements for safety in the event of component failure are rising sharply, in particular from level 3. It is no longer sufficient to design the "fail safe" (FS) system, for example if the ABS fails, the normal brake acts as a fall-back level without control function.

From level 3 of automated driving (HAD, highly automated driving), the condition "fail operational" (FO) is required, in which at least one ABS emergency function must still be provided in the event of a component failure, in order to ensure longitudinal and lateral stability of the vehicle when braking. With ABS, the coils of the valves are electrically tested for interruption and short circuits. Greater challenges can be found in the fulfillment of this requirement in the actuator system, for example, leaks due to dirt in valve seats and seals, in particular with dormant faults.

The transition from automated driving (HAD) to piloted driving (PD) is particularly critical, since other components that are not used in automated driving (HAD), such as the pedal interface with the master brake cylinder, have an additional effect here. The familiar characteristics of pedal actuation should not change, otherwise the driver will be irritated and emergency braking will not be optimal. Here, for example, it must be ensured that all seals work.

OBJECT OF THE INVENTION

The object of the invention is to provide a hydraulic device and a piston-cylinder unit sealing system for such devices, such as in particular for brake and clutch devices and the like, in particular for automated driving, which in the event of a functional failure of the device or a safety-relevant assembly or component, such as a seal, still ensures adequate functionality of the device.

Solution According to the Invention

This object may be achieved with the features as set forth in various ones of the accompanying claims With the solution according to the invention, it is advantageously achieved that a hydraulic system, such as, for example, a brake system in the event of functional impairments or failure of an assembly or component, remains functional to the extent that is required for increased requirements, such as automated driving, as described above.

In other words, in the broadest sense of the invention, all or part of the basic functions of the systems are maintained to a limited extent, wherein a so-called first fault diagnosis or monitoring is detected by means of redundancy so that the second fault cannot have any effect or lead to a failure of the system. Such basic functions in brake systems can be, for example, the brake boost, the pedal characteristics, in particular when changing from automated to piloted driving, maintaining longitudinal and lateral stability (ESP with "fail operational" sensors, full function with ABS on all road surfaces, detection of leaks in wheel brake circuits with corresponding remedial measures, e.g. against brake circuit failure.

In the broadest sense, redundant assemblies or components, such as seals, valves, pressure supplies, storage containers, control and regulating devices, are used here, wherein diagnosis devices or monitoring devices can expediently be provided in order to diagnose functional impairments or failures in a simple manner or to monitor and, if necessary, initiate measures to detect individual faults in redundant components.

The further claims contain expedient or advantageous embodiments and configurations of the invention, and also applications in various hydraulic systems, such as brake and clutch devices and the like, in which timely detection of functional defects in the seals is important in order to prevent system failures as far as possible.

The solution according to the invention and its advantageous embodiments or configurations can in principle be used with increased safety in all cylinders/pistons in hydraulic systems. The redundancy can also be extended to the entire system, e.g. ECU, valves, path simulator (WS) (without simulator valve), ABS (without outlet valve) with multiplex (MUX), further inlet valves and throttle, pressure supply, electrical power supply with drive and motor.

When using the redundancy according to the invention for seals, in particular the use of a second (redundant) seal together with a throttled return to a pressure-free chamber, in particular a storage container or to the outside, is provided. The throttle has the effect that if the second seal fails, the leakage flow is so low that it can still be tolerated by the system, in other words that, for example, in a brake system there is no system failure or there is still sufficient braking effect or braking and lateral stability. In this case, for example, a compensation of the volume loss due to the pressure supply or only slight unintentional pedal movement may be acceptable if the pedal path loss over the braking time is acceptable. Both can be detected by sensors during operation, by monitoring and during diagnosis. The leakage flow can also be limited using a suitable valve.

The solutions according to the invention with redundancy require a fail-safe diagnosis or monitoring of first faults, in order to warn, inter alia, that a possible second fault may have critical effects.

If a single component is used without redundancy, diagnoses in the passive area must ensure that no failure is possible in the active area, for example when the brake is actuated. This can be achieved by using the residual pressure in the system during braking with a subsequent vehicle stop, with the corresponding valve switching "closed-open-closed", for the diagnosis of tightness. This avoids a separate pre-drive check (PDC), which increases the load cycles, particularly of the seals.

These measures can be used, for example, in the case of brake systems for the tandem master brake cylinder (THZ), for the piston of a pressure supply and also for the piston of a path simulator and, if applicable, other seals. This means that the "path simulator with THZ" system can meet fail operational (FO) requirements.

A path simulator with a shut-off valve is common, for example, in brake systems. If this fails, the path simulator no longer works, so that the brake pedal becomes hard and the brake booster is switched off. In a system with a redundant pressure supply, the probability of failure is very low, so that a worse pedal characteristic can be accepted in the fall-back level. This means that the failure-critical valve can be dispensed with.

Advantageously, according to the invention, a path simulator system is designed without a valve and a return spring of the piston-cylinder unit (master cylinder) takes over the first surface part of the path simulator characteristic curve, in particular by axially displacing a sniffer hole provided on the piston-cylinder unit (master cylinder) by the corresponding amount (distance sniffer hole/piston in the retracted position).

The ABS or braking effect can be disrupted if the valve can no longer close due to dirt particles. If this happens at the end of braking, it may be very difficult for the diagnosis to detect this by a further braking. Possibly by measuring the induction voltage when closing the valve, since no or only a small armature movement is possible due to the dirt particles, which can be detected by measuring voltage V. As an improvement, it is also possible to use the multiplex method (MUX) to provide no outlet valve or only one outlet valve.

It is also important that with ABS function at least one wheel is always controlled per axle to ensure longitudinal and lateral stability. This is made possible by a further redundant switching valve in series, preferably with a multiplex (MUX) in a diagonal arrangement. This valve can also be used to close the connection to the wheel cylinder if, for example, it leaks. As is known, this can be diagnosed by the volume intake or volume requirement of the pressure supply. In this case, the corresponding switching valve or inlet valve is closed in known systems.

Full redundancy also includes, despite two-circuit pressure supply via a double-stroke piston, e.g. driven by two three-phase motors, a second two-circuit pressure supply via a double-stroke piston, e.g. driven by two three-phase motors, and with further isolating valves between the brake circuits and the pressure supply.

Redundancy also includes the redundant power supply, preferably from two different energy stores. At level 5 of AD (according to VDA definition), supply from two or three vehicle electrical systems may occur, as in aircraft technology.

According to the invention, the electronic control and regulating device (ECU), in particular diagnosis circuits, can also advantageously be designed redundantly or check itself. In this case, the voltage supply can be provided redundantly from the redundant electrical storage devices U1, U2 and occasionally additionally from U3, comparable to the aircraft technology with the so-called "2 out of 3" selection. This power supply powers the computers (CP1 to CP3). The output signals of the computers CP1 and CP2 act on the control of, for example, the motor and valves with the corresponding output stages. Here, it is possible to control the motors and valves with double or triple redundancy. However, this requires a lot of effort. Smart redundancy is possible here, in which only selected valves with redundant control are implemented. It is common for the ESP to permanently monitor the control. It is also advantageous if only the control with the computers CP1, CP2 and CP3 can be configured redundantly. For example, it is known to control a BLCD motor instead of three-phase with two three-phase, on the assumption that the motor mounting and the drive are fail-safe.

In a fully redundant brake system, preferably for fully autonomous driving AD (stage 5 of automated driving), it is also conceivable to design the brake system without a tandem master cylinder THZ (not shown). Here, the THZ can be replaced by a "brake and go" signal, which is generated in the central ECU by the AD.

For the entire computing functions for processing the input signals, one or more powerful computer CPUs, for example microcontrollers, are expediently used, which control the actuators, for example motors and valves, via the corresponding integrated or separate control with output stages.

The computers CP1, CP2 and CP3 can be set up redundantly, for example with double redundancy as CP1 and CP2 or triple redundancy as CP1 and CP2 and CP3. Because of the complexity, the computer CP2 can alternatively be used for reduced functions and the computer CP3 for emergency functions of the brake system. Accordingly, this also applies to the actuators and valves For the motor, this means that the redundant control for the two-winding combination, i.e. one three-phase redundancy, and for the valves that only one or two valves of one axis are controlled redundantly. Or just the control is redundant and acts on a valve, since the failure rate of the coil of a valve is extremely low.

All input signals from the sensors and the brake and go signal can thus advantageously act on all computers CP1, CP2, CP3. The output signals for the control with output stages are also separate from each CP.

With the tendency towards architecture with domains and central computers, it makes sense to design the control separately in an ECU as a slave. The slave ECU then contains the entire control with output stages and possibly I/O for sensors or brake and go switch signals. The signal transmission to the master ECU then takes place via redundant bus systems, if necessary in accordance with the above-mentioned computer structure for full function to emergency function with different structure and different protocols.

Because of the low complexity of the slave ECU, costs can be saved by simply unbundling the circuit board with one layer or only a few layers. Due to the high complexity of the functions, neural networks in the software are particularly suitable.

Another way to save costs is to omit the plungers on the auxiliary piston. With conventional master brake cylinders, there is the option of coupling the primary piston to the secondary piston in the event that the primary circuit fails. In this case, the primary piston hits the secondary piston and generates brake pressure in the secondary circuit. Without this feature, the brake would fail completely. This applies to conventional systems without redundancies. A redundant solution is proposed for the following system solution. The failure of the primary circuit has no effect here, since an isolating valve closes the primary circuit in this case. In addition, if the primary circuit fails and the pressure supply to system 1 (booster) fails, the secondary circuit is supplied by a separate pressure supply to the second system (ESP). In the event of a total failure, 3 faults, i.e. both pressure supplies and the primary circuit, would have to fail, resulting in a failure rate of approx. $10^{-14}$/year. For comparison, the failure rate of a brake circuit is around $10^{-5}$/year.

Figure 3:
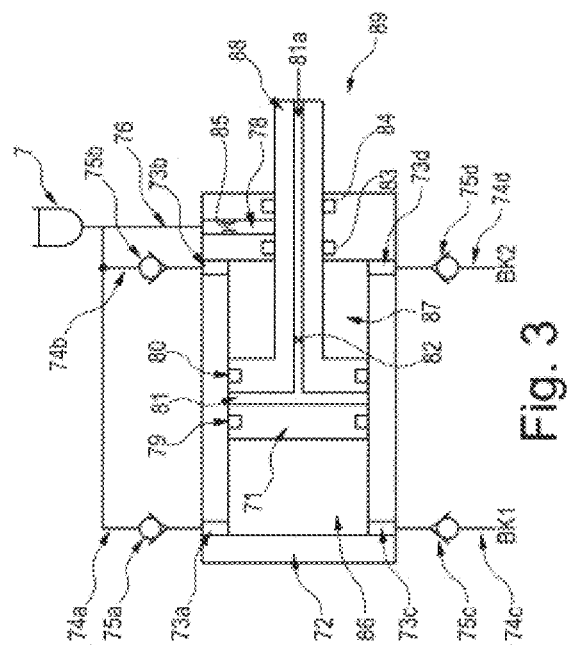
Figure 2:
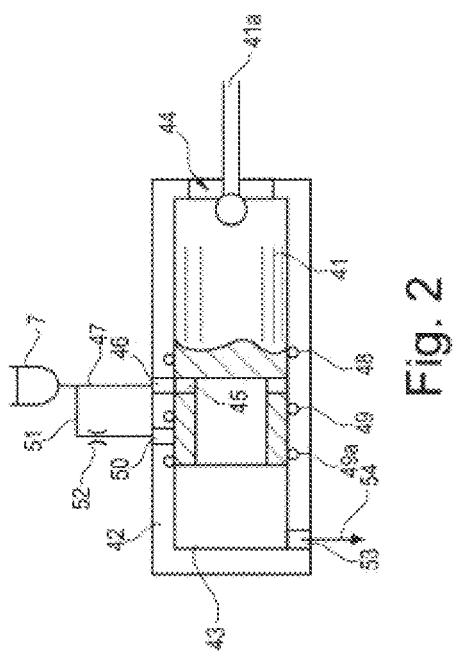
Figure 4:
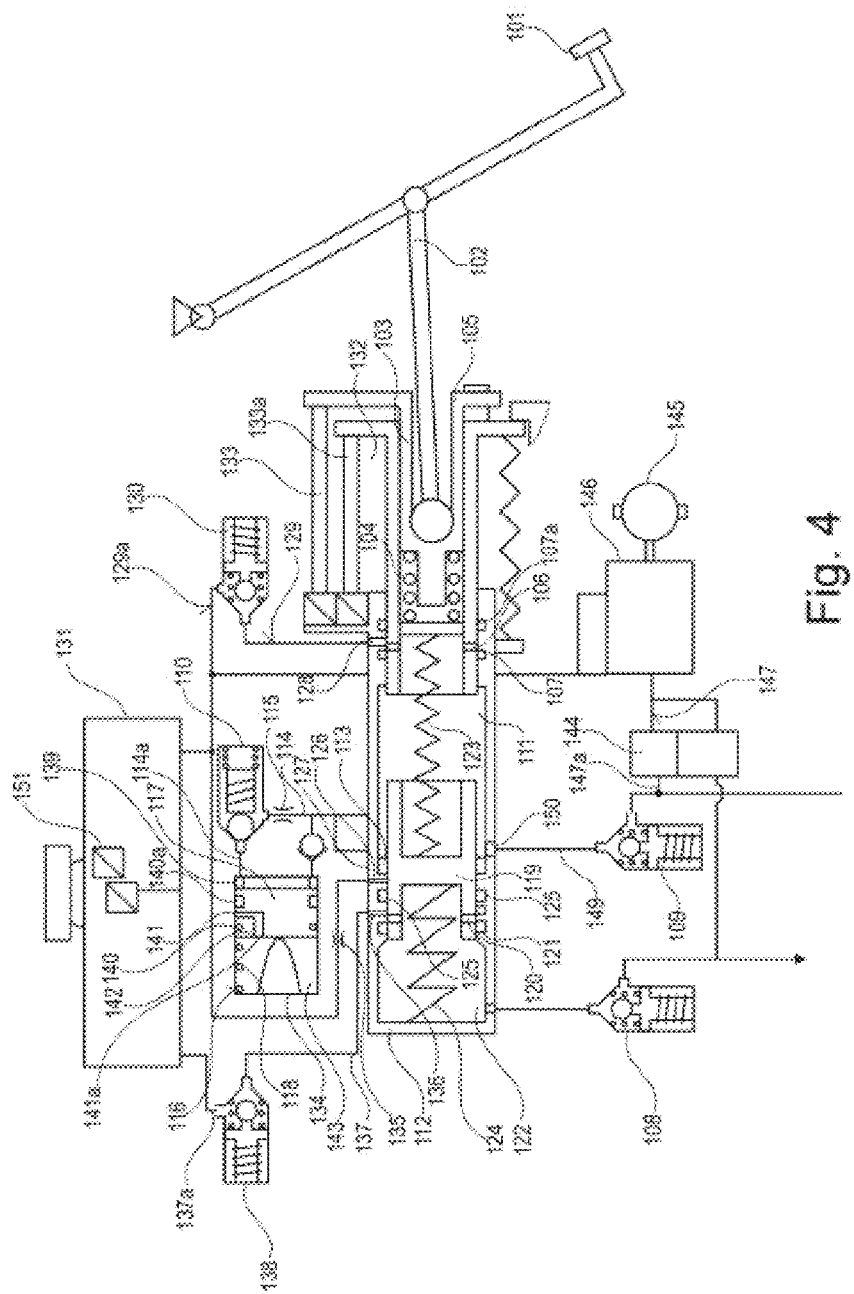
Figure 5:
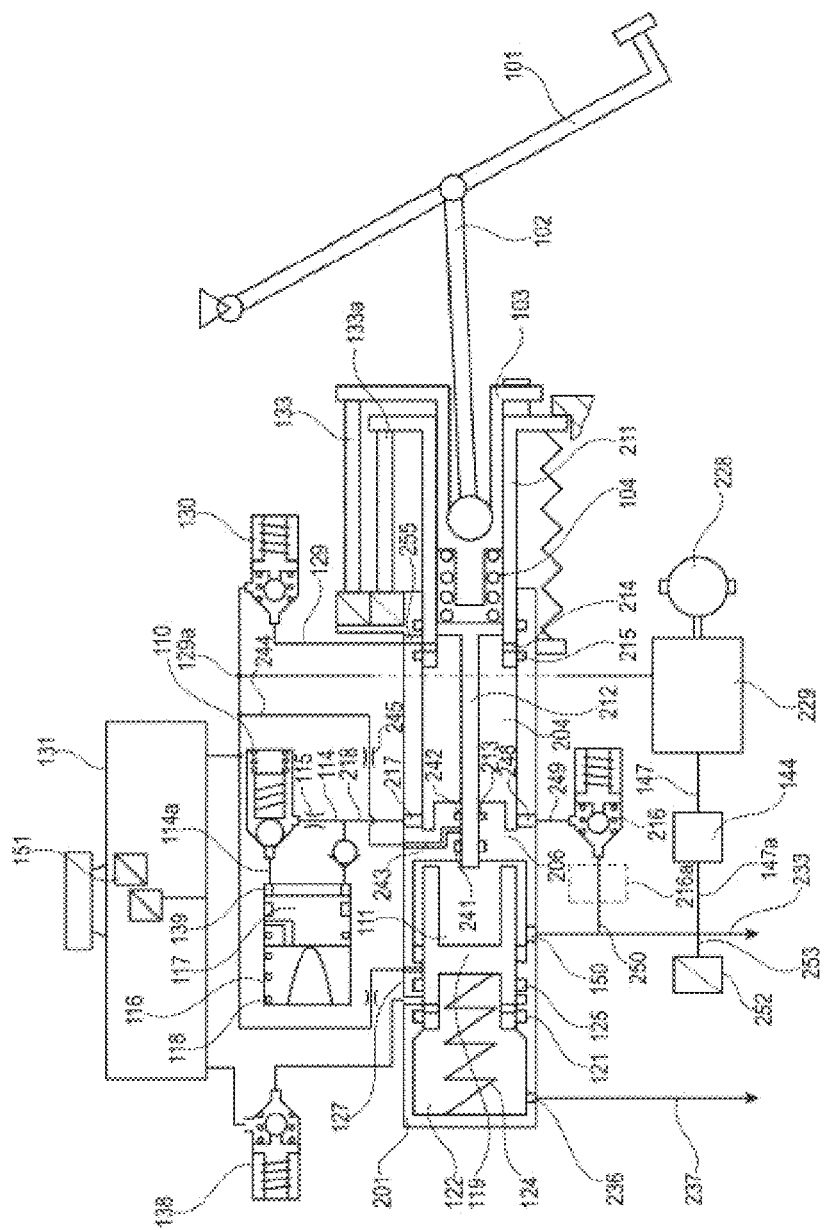
Figure 5A:
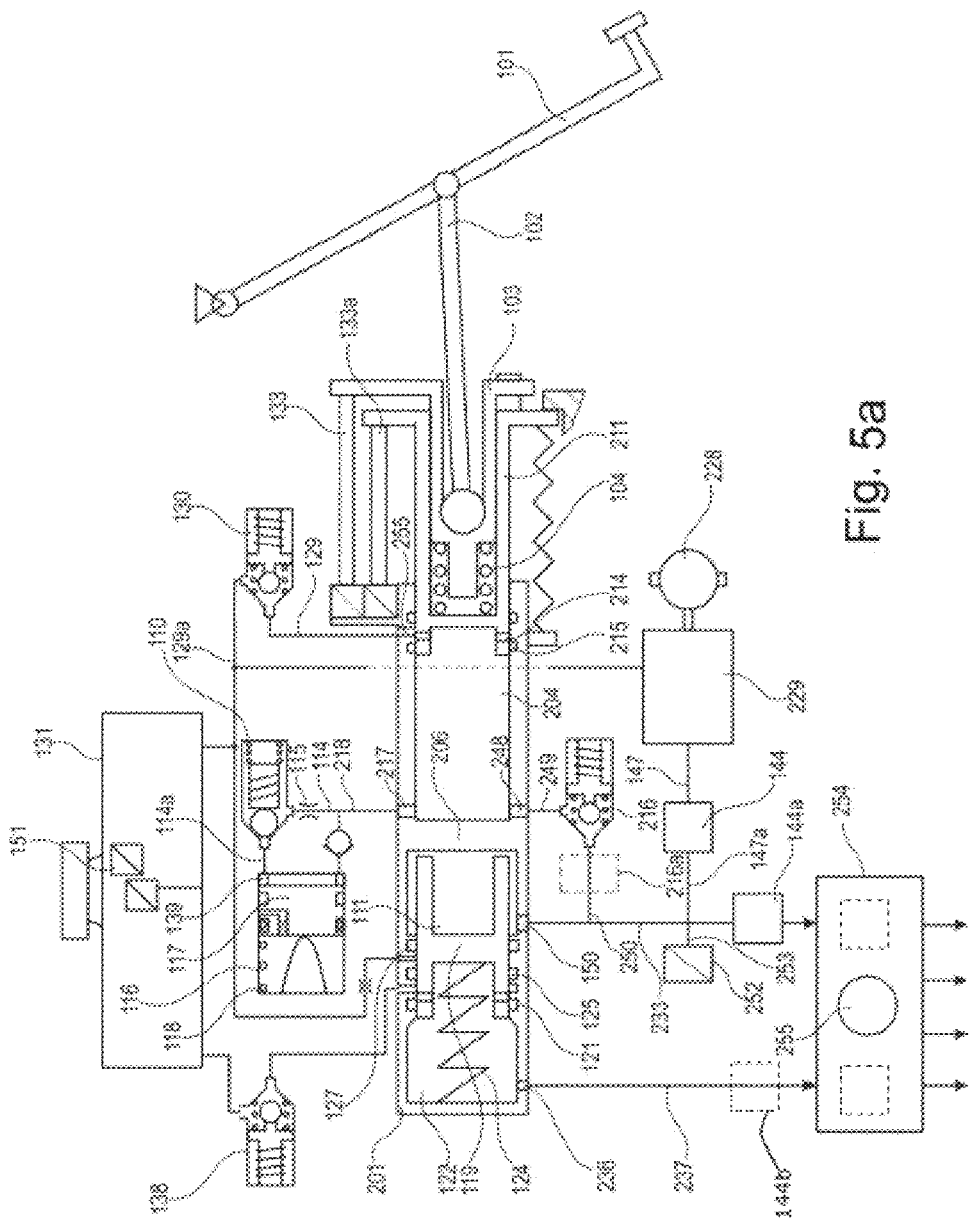
Figure 6:
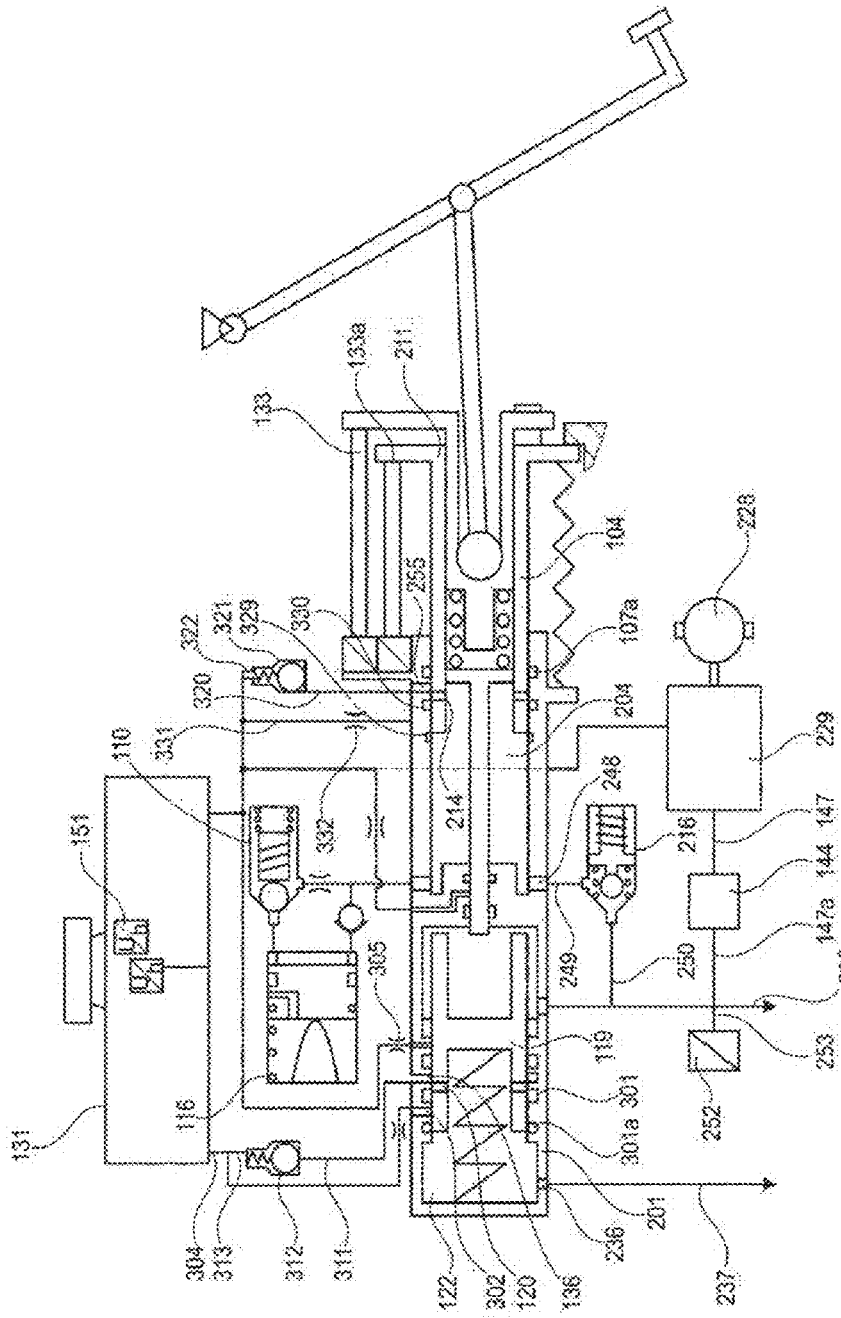
Figure 7:
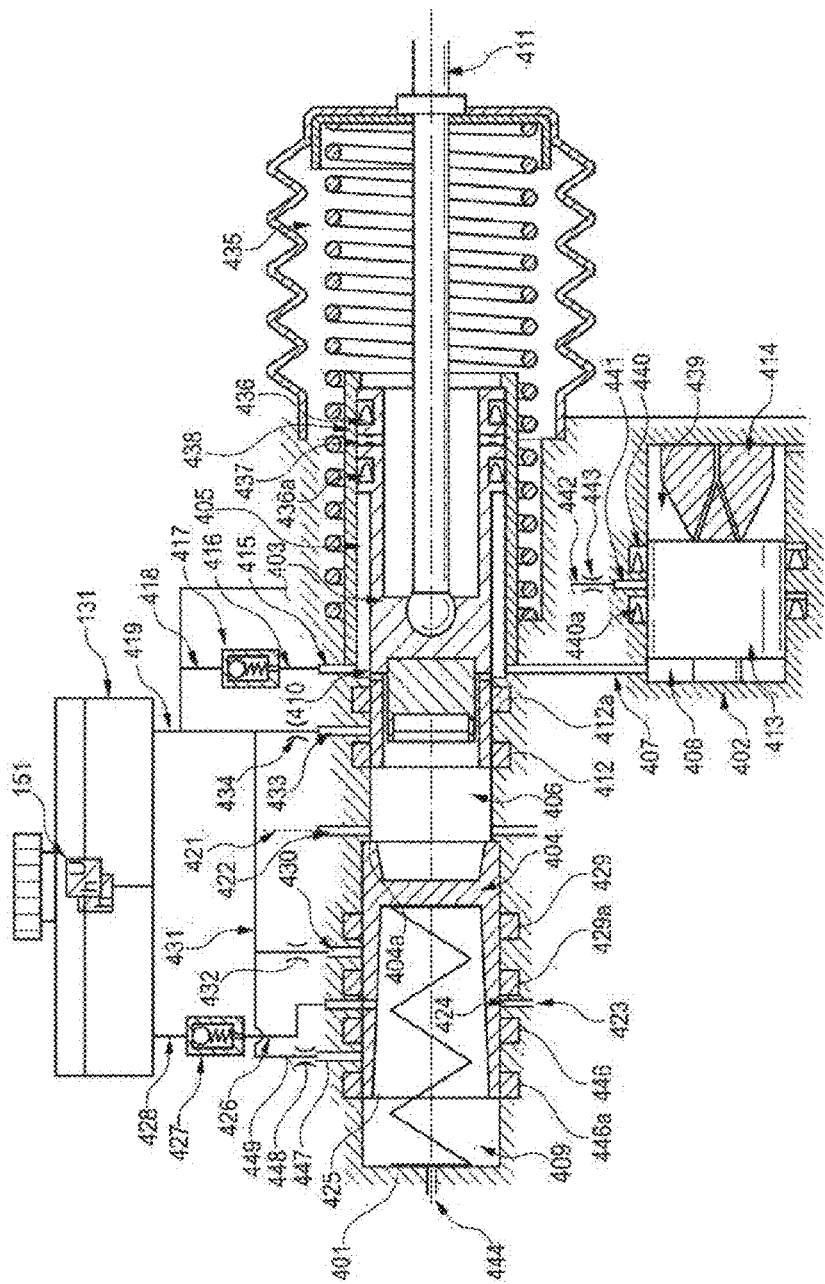
Figure 8:
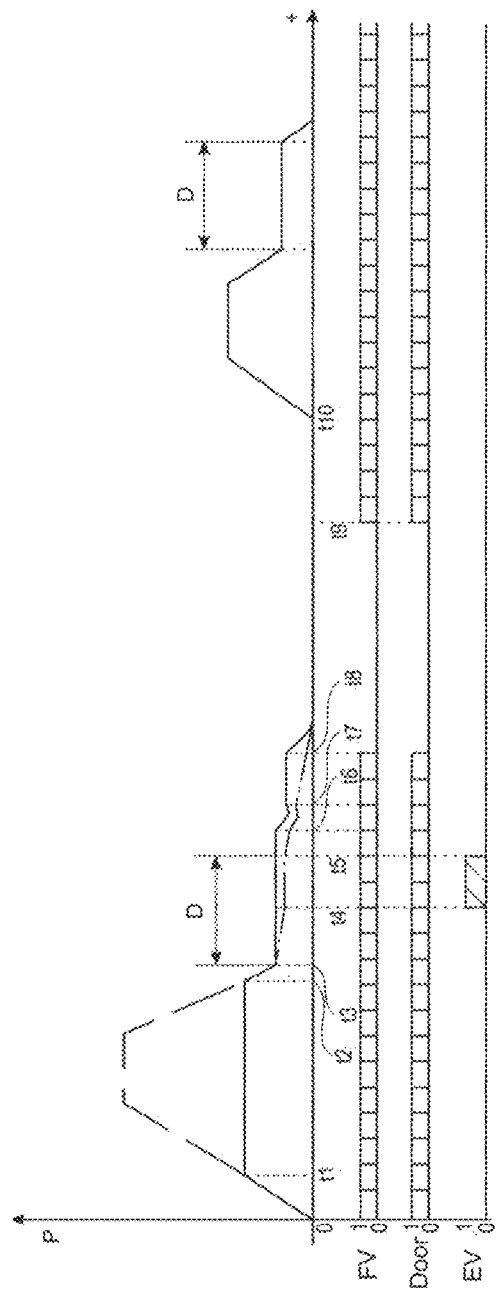
Figure 9C:
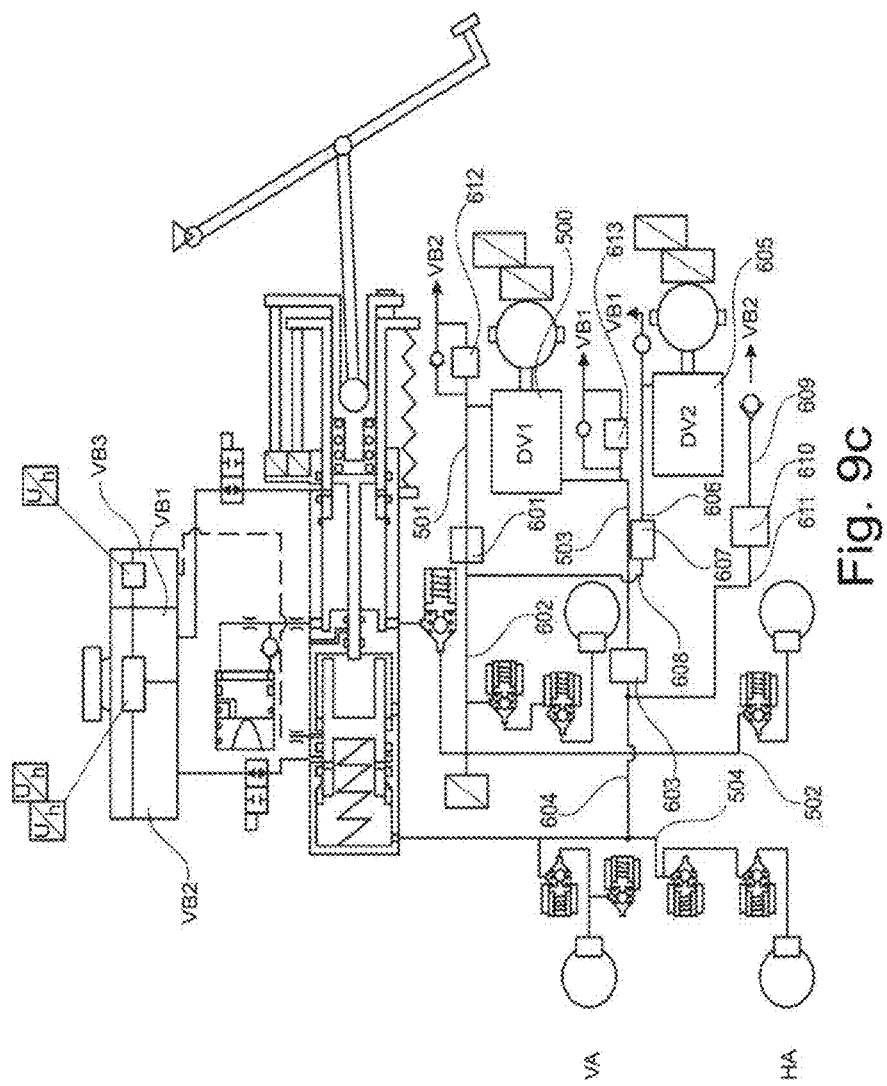
Figure 9D:
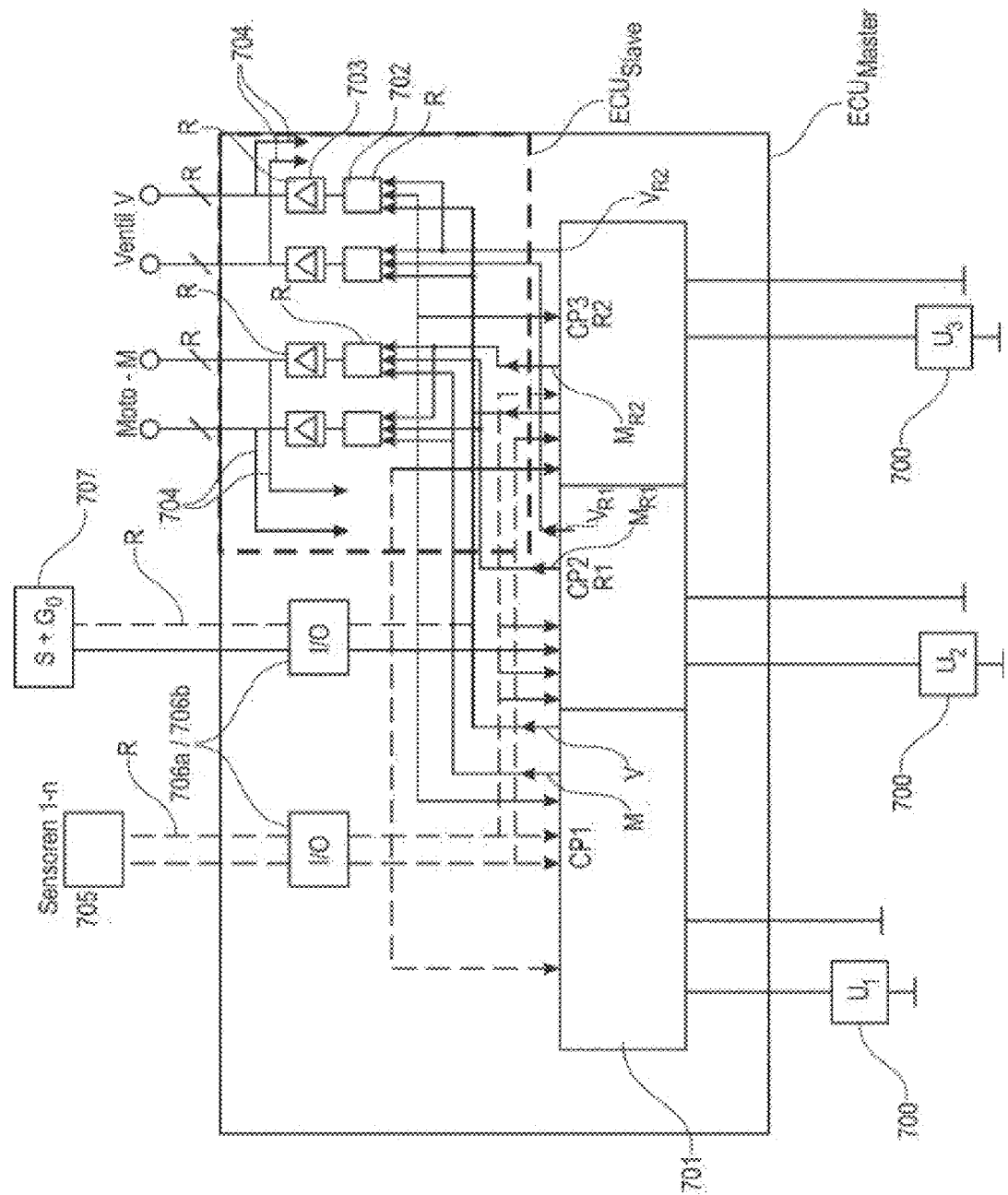

Further advantageous or expedient embodiments of the invention and their features are shown in the drawing and described in more detail below, wherein:

FIG. 1: shows a piston arrangement with two pressure chambers and a redundant seal with a throttle to a storage container;

FIG. 2: shows a piston arrangement with mechanical actuation and a pressure chamber with a redundant seal with a throttle to the storage container;

FIG. 3: shows a double-stroke piston with two pressure chambers and a redundant seal with a throttle for each piston;

FIG. 4: shows a tandem master cylinder (THZ) with primary and secondary pistons with a path simulator and pressure supply and redundant seal for the path simulator with a throttle and outlet to the outside or the storage container and a diagnosis valve from the sniffer hole of the piston to the storage container;

FIG. 5: is similar to FIG. 4 for a tandem master cylinder arrangement with a plunger on an auxiliary piston and a redundant seal with a throttle to the storage container on the plunger;

FIG. 5a: is similar to FIG. 5 but without a plunger on the auxiliary piston;

FIG. 6: is similar to FIG. 5 with a flow check valve instead of the diagnosis valve;

FIG. 7: shows a tandem master cylinder arrangement with three pistons, each with a redundant seal per piston with a throttle to the storage container and a path simulator with redundant seal and throttle to the outlet to the outside;

FIG. 8: shows a pressure curve and control signals for a typical diagnosis cycle;

FIG. 9a: shows a brake system with ECU (extension of the partial brake system according to FIG. 5) and redundant valves and a further storage container;

FIG. 9b: shows an embodiment of a throttle according to the invention;

FIG. 9c: shows a brake system substantially like FIG. 9a, with redundant pressure supply (DV1, DV2); and FIG. 9d: schematically shows the basic concept of a redundant control device (ECU) as can be used expediently according to the invention, e.g. for brake systems according to FIGS. 9a and 9c.

FIG. 1 shows different hydraulic applications in the upper and lower halves. The upper part shows an application in a brake system, while the lower part shows an application in a hydraulic actuator.

The application in a brake system (upper part of FIG. 1) shows the redundancy in a piston 1, for example the secondary circular piston (SK piston) of a tandem master brake cylinder 2 (THZ). If the working chamber or the primary chamber 3 is pressurized, e.g. by a pressure supply (not shown) via the hydraulic line 14 and channel 13 in the tandem master cylinder 2 (THZ), then the piston 1 in the tandem master cylinder 2 (THZ) moves to the left. If the bore 17 of the piston 1 has been moved past the seal 8 of the tandem master brake cylinder 2 (THZ), then brake fluid from the secondary chamber 4 of the tandem master brake cylinder 2 (THZ) is displaced through the channel 15 and through the hydraulic line 16, for example into the wheel brake cylinders (not shown).

A seal 9 is provided for the hydraulic separation of the primary chamber 3 of the tandem master brake cylinder 2 (THZ) from the channel 5, which is connected to the storage container 7 (VB) via a hydraulic line 6. According to the redundancy principle according to the invention, the seal 9 is supplemented by a redundant seal 9a and a channel 10. The channel 10 is connected to the storage container 7 (VB) via a hydraulic line 11, a hydraulic line 6 and a throttle 12. The redundant seal 9a thus hydraulically separates the working chamber 3 of the tandem master cylinder 2 (THZ) from the channel 10 and thus also from the storage container 7 (VB).

If the redundant seal 9a is intact, the channel 10 is hydraulically separated from the working chamber 3 of the tandem master cylinder 2 (THZ). As a result, no brake fluid flows from the working chamber 3 of the tandem master brake cylinder 2 (THZ) to the channel 10, even if the working chamber 3 of the tandem master brake cylinder 2 (THZ) is under pressure. By connecting the channel 10 to the storage container 7 (VB) via a hydraulic line 11, a hydraulic line 6 and the throttle 12, the pressure in the channel 10 is equal to the pressure in the storage container 7 (VB) if there are differences in height between the storage container 7 (VB) and the channel 10 are neglected. The channel 5 is also connected to the storage container 7 (VB) via a hydraulic line 6, so that the pressure in the channel 5 is also equal to the pressure in the storage container 7 (VB), although here, too, differences in height between the storage container 7 (VB) and the channel 5 are neglected. If the redundant seal 9a is intact, the seal 9 is therefore not loaded, even if the working chamber 3 of the tandem master brake cylinder 2 (THZ) is under pressure.

Furthermore, if the redundant seal 9a is intact, any dirt particles in the working chamber 3 of the tandem master brake cylinder 2 (THZ) are retained by the redundant seal 9a, so that they cannot penetrate the channel 10 and cannot damage the seal 9. If the redundant seal 9a is intact, the seal 9 does not fail.

If the redundant seal 9a leaks, e.g. due to wear or dirt particles, brake fluid can flow from the chamber 3 of the tandem master brake cylinder 2 (THZ) through the channel 10 and the hydraulic line 1, the hydraulic line 6 and the throttle 12 to the storage container 7 (VB). In this state, the seal 9 takes over the hydraulic separation of the working chamber 3 of the tandem master brake cylinder 2 (THZ) from the channel 5, which is connected to the storage container 7 (VB) via a hydraulic line 6. The throttle 12 is dimensioned such that the flow can be compensated for by the leakage of the redundant seal 9a from a pressure supply (not shown) in the hydraulic line 14. Furthermore, the equalizing flow of the pressure supply is an indicator of the leakage of the redundant seal 9a.

Leakage in the redundant seal 9a can thus be detected during operation without the leakage disrupting the operation. Therefore, this redundancy leads to a hydraulic separation of the working chamber 3 of the tandem master brake cylinder 2 (THZ) from the storage container 7 (VB), which can be referred to as fail operational.

The application with a hydraulic actuator (lower part of FIG. 1) shows the redundancy with a piston 21, for example the actuator piston of a clutch (not shown). If the working chamber 24 is pressurized, e.g. by a pressure supply (not shown) via the hydraulic line 28 and the channel 27 in the cylinder 23, then the piston 21 is displaced to the left in the cylinder 23. With this displacement of the piston 21 to the left, the piston plunger 22 can exert a force 26 on the clutch (not shown) which corresponds to the pressure in the working chamber 24.

A seal 9 is provided for the hydraulic separation of the working chamber 24 of the cylinder 23 from the inner chamber 25 of the cylinder 23. According to the redundancy, the seal 9 is supplemented by a redundant seal 9a and a channel 10. The channel 10 is connected to the storage container 7 (VB) via a hydraulic line 17, a hydraulic line 6 and a throttle 12. The redundant seal 9a thus hydraulically separates the working chamber 24 of the cylinder 23 (THZ) from the channel 10 and thus also from the storage container 7 (VB) and also from the inner chamber 25 of the cylinder 23.

If the redundant seal 9a is intact, the channel 10 is hydraulically separated from the working chamber 24 of the cylinder 23. As a result, no hydraulic fluid flows from the working chamber 24 of the cylinder 23 to the channel 10, even if the working chamber 24 of the cylinder 23 is under pressure. By connecting the channel 10 to the storage container 7 (VB) via a hydraulic line 27 and the throttle 12, the pressure in the channel 10 is equal to the pressure in the storage container 7 (VB) if there are differences in height between the storage container 7 (VB) and the channel 10 are neglected. If the pressure in the storage container 7 (VB) equals the atmospheric pressure, and if the interior 25 of the cylinder 23 equals the atmospheric pressure, then the seal 9 is not loaded when the redundant seal 9a is intact, even if the working chamber 24 of the cylinder 23 is under pressure.

Furthermore, if the redundant seal 9a is intact, any dirt particles in the working chamber 24 of the cylinder 23 are retained by the redundant seal 9a, so that they cannot penetrate into the channel 10 and cannot damage the seal 9. If the redundant seal 9a is intact, the seal 9 does not fail.

If the redundant seal 9a leaks, e.g. due to wear or dirt particles, hydraulic fluid can flow from the chamber 24 of the cylinder 23 through the channel 10 and the hydraulic line 27 and the throttle 12 to the storage container 7 (VB). In this state, the seal 9 takes over the hydraulic separation of the working chamber 24 of the cylinder 23 from the inner chamber 25 of the cylinder 23. The throttle 12 is dimensioned such that the flow can be compensated for by the leakage of the redundant seal 9a from the pressure supply (not shown) in the hydraulic line 28. Furthermore, the equalizing flow of the pressure supply is an indicator of the leakage of the redundant seal 9a.

Leakage in the redundant seal 9a can thus be detected during operation without the leakage disrupting the operation. Therefore, this redundancy leads to a hydraulic separation of the working chamber 24 from the inner chamber 25 of the cylinder 23, which can be referred to as fail operational.

FIG. 2 shows the redundancy in the case of a piston 41, e.g. the primary piston of a tandem master brake cylinder 42 (THZ), which is operated by a plunger 41a. The plunger 41a is connected to a brake pedal (not shown). In the rest position of the primary piston 41 shown, the primary chamber 43 of the tandem master brake cylinder 42 (THZ) is connected to the storage container 7 (VB) through the bore 45 of the primary piston 41, through the channel 46 in the tandem master brake cylinder 42 (THZ) and through the hydraulic line 47. By actuating the brake pedal (not shown), the driver can displace the primary piston 41 to the left. If during this displacement, the bore 45 of the primary piston 41 is pushed past the redundant seal 49a of the tandem master brake cylinder 42 (THZ), then brake fluid from the primary chamber 43 of the tandem master brake cylinder 42 (THZ) is passed through the channel 53 and through the hydraulic line 54 in a wheel brake cylinder (not shown).

A seal 49 is provided for the hydraulic separation of the primary chamber 43 of the tandem master brake cylinder 42 (THZ) from the channel 46, which is connected to the storage container 7 (VB) via a hydraulic line 47. According to the redundancy, the seal 49 is supplemented by a redundant seal 49a and a channel 50. The channel 50 is connected to the storage container 7 (VB) via a hydraulic line 51, a hydraulic line 47 and a throttle 52. The redundant seal 49a thus hydraulically separates the primary chamber 43 of the tandem master brake cylinder 42 (THZ) from the channel 50 and thus also from the storage container 7 (VB). The seal 48 hydraulically separates the channel 46 from the piston plunger chamber 44.

If the redundant seal 49a is intact, the channel 50 is hydraulically separated from the primary chamber 43 of the tandem master brake cylinder 42 (THZ). As a result, no volume flows from the primary chamber 43 of the tandem master brake cylinder 42 (THZ) to the channel 50, even if the primary chamber 43 of the tandem master brake cylinder 42 (THZ) is under pressure. By connecting the channel 50 to the storage container 7 (VB) via a hydraulic line 51, a hydraulic line 47 and a throttle 52, the pressure in the channel 50 is equal to the pressure in the storage container 7 (VB) if there are differences in height between the storage container 7 (VB) and the channel 50 are neglected. The channel 46 is also connected to the storage container 7 (VB) via a hydraulic line 47, so that the pressure in the channel 46 is also equal to the pressure in the storage container 7 (VB), although here, too, differences in height between the storage container 7 (VB) and the channel 46 are neglected. If the redundant seal 49a is intact, the seal 49 is therefore not loaded, even if the primary chamber 43 of the tandem master brake cylinder 42 (THZ) is under pressure.

Furthermore, if the redundant seal 49a is intact, any dirt particles in the primary chamber 43 of the tandem master brake cylinder 42 (THZ) are retained by the redundant seal 49a so that they cannot penetrate into the channel 50 and cannot damage the seal 49. If the redundant seal 49a is intact, the seal 49 does not fail.

If the redundant seal 49a leaks, e.g. due to wear or dirt particles, brake fluid can flow from the primary chamber 43 of the tandem master brake cylinder 42 (THZ) through the channel 50 and the hydraulic line 51, the hydraulic line 47 and the throttle 52 to the storage container 7 (VB). In this state, the seal 49 takes over the hydraulic separation of the primary chamber 43 of the tandem master brake cylinder 42 (THZ) from the channel 46, which is connected to the storage container 7 (VB) via a hydraulic line 47.

The throttle 52 is dimensioned such that the flow through the leakage of the redundant seal 49a can be compensated by the driver by depressing the brake pedal (not shown). The brake pedal does not fall through. The equalizing flow is also an indicator of the leakage of the redundant seal 49a.

Leakage in the redundant seal 49a can thus be detected during operation without the brake pedal falling through due to this leakage. Therefore, this redundancy leads to a hydraulic separation of the primary chamber 43 of the tandem master brake cylinder 42 (THZ) from the storage container 7 (VB), which can be referred to as fail operational.

FIG. 3 shows the redundancy in a stepped piston 71, e.g. a double-stroke piston (DHK), in a cylinder 72 of a pressure supply. The function of this pressure supply is explained here as an example. The cylinder 72 has five channels, 73a, 73b, 73c, 73d and 78. The channels 73a and 73b are connected via hydraulic lines 74a and 74b, in which suction valves 75a and 75b are accommodated, and via the hydraulic line 76 to the storage container 7 (VB). The channels 73c and 73d are connected to brake circuits BK1 and BK2 via hydraulic lines 74c and 74d, in which check valves 75a and 75b are accommodated. Two seals 79 and 80 are accommodated in the stepped piston 71. A channel 81 and 81a with a throttle 82 is located between the seals 79 and 80. Furthermore, two seals 83 and 84 are accommodated in the cylinder 72. The channel 78 with a throttle 85 is located between the seals 83 and 84. The channel 78 is connected to the storage container 7 (VB) via the hydraulic line 76.

The double-stroke piston 71 (DHK) divides the cylinder 72 into two working chambers, a chamber 86 and a ring chamber 87. If the stepped piston 71 is displaced to the left in FIG. 3 (forward stroke of the double-stroke piston 71, DHK), the suction valve 75a closes and the check valve 75c opens, and brake fluid is pushed from the chamber 86 via the channel 73c and via the hydraulic line 74c into the brake circuit BK1. The suction valve 75b opens and the check valve 75d closes and brake fluid is sucked from the storage container 7 (VB) into the ring chamber 87 via the channel 73b, the suction valve 75b and the hydraulic line 76.

If the stepped piston 71 is displaced to the right in FIG. 3 (return stroke of the double-stroke piston 71, DHK), the suction valve 75a opens and the check valve 75c closes, and brake fluid is introduced into the chamber 86 via the channel 73a and via the hydraulic line 74a with suction valve 75a and sucked out of the storage container 7 (VB) via the hydraulic line 76. The suction valve 75b closes and the check valve 75d opens and brake fluid is displaced from the ring chamber 87 into the brake circuit BK2 via the channel 73d, the suction valve 75d and the hydraulic line 74d.

The two seals 79 and 80 are provided for the hydraulic separation of the chamber 86 of the cylinder 72 from the ring chamber 87. Between these two seals 79 and 80, a channel 81 and a channel 81a are provided, which contains a throttle 82. If the seals 79 and 80 are intact, i.e. no brake fluid flows through the channels 81, 81a and through the throttle 82 into the piston rod chamber 89, the pressure in the channel 81 is the same as the pressure in the piston rod chamber 89.

If the seal 79 leaks, e.g. due to wear or dirt particles, brake fluid can flow out of the chamber 86 of the cylinder 72 through the channel 81, the channel 81a and the throttle 82 of the double-stroke piston (DHK) into the piston rod chamber 89 during the forward stroke of the double-stroke piston 71 (DHK) (leakage flowflow). The throttle 82 is dimensioned such that the flow through the leakage of the seal 79 from the pressure supply can be compensated for by correcting the forward stroke of the double-stroke piston 71 (DHK). Furthermore, the equalizing flow of the pressure supply is an indicator of the leakage of the seal 79.

Leakage in the seal 79 can thus be detected during operation during the forward stroke of the double-stroke piston 71 (DHK) without the operation being disrupted by this leakage. This redundancy therefore leads to a hydraulic separation of the chamber from the ring chamber 87 of the cylinder 72, which can be referred to as fail operational when the double-stroke piston 71 (DHK) is advanced.

If the seal 80 leaks, e.g. due to wear or dirt particles, brake fluid can flow out of the ring chamber 87 of the cylinder 72 through the passage 81, the passage 81a and the throttle 82 of the double stroke piston 71 (DHK) during the return stroke of the double-stroke piston 71 (DHK). The throttle 82 is dimensioned such that the flow through the leakage of the seal 80 from the pressure supply can be compensated for by correcting the return stroke of the double-stroke piston 71 (DHK). Furthermore, the equalizing flow of the pressure supply is an indicator of the leakage of the seal 80.

Leakage in the seal 80 can thus be detected during operation during the return stroke of the double-stroke piston 71 (DHK) without the operation being disrupted by this leakage. This redundancy therefore leads to a hydraulic separation of the chamber 86 of the cylinder 72 from the ring chamber 87, which can be referred to as fail operational when the double-stroke piston 71 (DHK) returns.

The seal 83 and the seal 84 for the piston rod 88 are provided for the hydraulic separation of the ring chamber 87 of the cylinder 22 from the piston rod chamber 89. Between these seals 83 and the seal 84, a channel 78 is provided, which contains a throttle 85. By connecting the channel 78 to the storage container 7 (VB) via a hydraulic line 76 and a throttle 85, the pressure in the channel 78 with the seal 83 intact is equal to the pressure in the storage container 7 (VB) if there are differences in height between the storage container 7 (VB) and the channel 78 are neglected.

If the pressure in the piston rod chamber 89 is the same as the pressure in the storage container 7 (VB), then the seal 84 is not loaded when the seal 83 is intact, even when the ring chamber 87 of the cylinder 72 is under pressure.

Furthermore, if the seal 83 is intact, any dirt particles in the ring chamber 87 of the cylinder 72 are retained by the seal 83, so that they cannot penetrate into the channel 78 and cannot damage the seal 84. If the seal 83 is intact, the seal 84 does not fail.

If the seal 83 leaks, e.g. due to wear or dirt particles, brake fluid can flow from the ring chamber 87 of the cylinder 72 through the channel 78 and the hydraulic line 76 and the throttle 85 to the storage container 7 (VB). In this state, the seal 84 takes over the hydraulic separation of the ring chamber 87 of the cylinder 72 from the piston rod chamber 89. The throttle 85 is dimensioned such that the flow can be compensated for by the leakage of the seal 83 by correcting the return stroke of the double-stroke piston 71 (DHK). Furthermore, the equalizing flow of the pressure supply is an indicator of the leakage of the seal 83.

Leakage in the seal 83 can thus be detected during operation during the return stroke of the double-stroke piston 71 (DHK) without the operation being disrupted by this leakage. Therefore, this redundancy leads to a hydraulic separation of the ring chamber 87 of the cylinder 72 from the piston rod chamber 89, which can be referred to as fail operational when the double-stroke piston 71 (DHK) returns.

FIG. 4 shows a brake system in which the redundancy is used with two seals. First, the brake system is briefly described.

The brake pedal 101 is actuated by the driver's foot when the driver actuates braking. When the brake pedal 101 is actuated, the pedal tappet 102 and the pedal piston 103 are displaced to the left in FIG. 4. The primary piston 105 of the tandem master brake cylinder 112 (THZ) is also displaced to the left via the pedal piston spring 104. If, during this left displacement of the primary piston 105, the bore 106 of the primary piston 105 has passed the seal 107, then with the isolating valves 108 and 109 closed and the simulator valve 110 open, then volume is displaced from the primary chamber 111 of the tandem master brake cylinder 112 (THZ) through the channel 113 of the primary chamber 111, through the hydraulic line 114 with the throttle 115 and through the opened simulator valve 110 and through the hydraulic line 114a into the working chamber 139 of the path simulator 116. The path simulator piston 117 of the path simulator 116 thereby is also displaced to the left in FIG. 4 against a spring set 118 of the path simulator 116, as a result of which the pressure in the path simulator 116 and thus also the pressure in the primary chamber 111 of the tandem master brake cylinder 112 (THZ) increases.

Due to the pressure in the primary chamber 111 of the tandem master brake cylinder 112 (THZ), the secondary piston 119 is displaced to the left in the tandem master brake cylinder 112 (THZ) in FIG. 4. If the bore 120 of the secondary piston 119 has passed the seal 121 during the left displacement of the secondary piston 119, then the left displacement of the secondary piston stops with the isolating valves 108 and 109 closed, because the secondary chamber 122 of the tandem master brake cylinder 112 (THZ) is then a closed chamber. If the spring forces of the primary piston spring 123, the secondary piston spring 124 are neglected and if the frictional forces of the seals 121, 125, 127 on the secondary piston 119 are neglected, the pressure in the secondary chamber 122 is equal to the pressure in the primary chamber 111.

As already described, the seal 107 hydraulically separates the primary chamber 111 of the tandem master brake cylinder 112 (THZ) from the channel 128 of the tandem master brake cylinder 112 (THZ) when the primary piston 105 is displaced to the left. This interrupts the connection of the primary chamber 111 of the tandem master brake cylinder 112 (THZ) via the bore 106 of the primary piston 5 and via the channel 128 of the tandem master brake cylinder 112 (THZ) and via the hydraulic lines 129 and 129a and via the opened diagnosis valve 130 to the storage container 131 (VB). By connecting the channel 128 to the storage container 131 (VB) via the hydraulic lines 129 and 129a, and via the opened diagnosis valve 130, the pressure in the channel 128 is equal to the pressure in the storage container 131 (VB) if there are differences in height between the storage container 131 (VB) and the channel 128 are neglected.

If the pressure in the outer chamber 132 of the tandem master brake cylinder 112 (THZ) is the same as the pressure in the storage container 131 (VB), the seal 107a is not loaded when the seal 107 is intact, even if the primary chamber 111 of the tandem master brake cylinder 112 (THZ) is under pressure. Furthermore, if the seal 107 is intact, any dirt particles in the primary chamber 111 of the tandem master brake cylinder 112 (THZ) are retained by the seal 107, so that they cannot penetrate into the channel 128 and cannot damage the seal 107a. If the seal 107 is intact, the seal 107a does not fail.

If the seal 107 leaks, for example due to wear or dirt particles, brake fluid can flow out of the primary chamber 111 of the tandem master brake cylinder 112 (THZ) through the channel 128, through the hydraulic lines 129 and 129a and through the opened diagnosis valve 130 to the storage container 131 (VB). This outflow of brake fluid can be stopped by closing the diagnosis valve 130. The outflow of brake fluid is an indicator of the leakage of the seal 107 and can be determined by means of the displacement sensors 133 and 133a, the force of the pedal piston spring 104 and the pressure-volume characteristic of the path simulator 116.

Leakage in the seal 107 can thus be detected during operation without the leakage disrupting operation. Therefore, the combination of the seal 107 with the diagnosis valve 130 leads to a hydraulic separation of the primary chamber 111 of the THZ 112 from the storage container 131 (VB), which can be referred to as fail operational.

The combination of the seal 125 and the redundant seal 127 with the channel 126, and the hydraulic line 134 and the hydraulic line 129a to the storage container 131 (VB) and with the throttle 135 leads to a hydraulic separation of the primary chamber 111 of the THZ 112 from the storage container 131 (VB), which can be referred to as fail operational, as described in FIG. 1.

The combination of the seal 121 and the seal 125 with the channel 136, and the hydraulic lines 137 and 137a and the shut-off valve 138 and the hydraulic line 129a to the storage container 131 (VB) leads to a hydraulic separation of the secondary chamber 122 of the THZ 112 from the storage container 131 (VB), which can be referred to as fail operational, as already described in FIG. 4 for the combination of the seal 107 and the seal 107a with channel 128, and the hydraulic lines 129 and 129a and the diagnosis valve 130 to the storage container 131 (VB).

The path simulator piston 117 of the path simulator 116 contains a seal 140 and a redundant seal 140a. A channel 141 and a channel 141a with a throttle 142 are located between the seal 140 and the redundant seal 140a, wherein the channel 141 opens into the chamber 143 of the spring set 118. The redundant seal 140a hydraulically separates the working chamber 139 of the path simulator 116 from the spring set chamber 118 of the path simulator 116.

If the redundant seal 140a is intact, no brake fluid flows from the working chamber 139 of the path simulator 116 through the channels 141, 141a and through the throttle 142 into the spring set chamber 143 of the path simulator 116. If the redundant seal 140a is intact, the pressure in the channel 141 is therefore the same as the pressure in the spring set chamber 143 of the path simulator 116. If the redundant seal 140a is intact, the seal 140 is therefore not loaded, even if the working chamber 139 of the path simulator 116 is under pressure. Furthermore, if the redundant seal 140a is intact, any dirt particles in the working chamber 139 of the path simulator 116 are retained by the redundant seal 140a, so that they cannot penetrate the channel 141 and cannot damage the seal 140. If the redundant seal 140a is intact, the seal 140 does not fail.

If the redundant seal 140a leaks, e.g. due to wear or dirt particles, brake fluid can flow out of the working chamber 139 of the path simulator 116 through the channel 141 and through the channel 141a with the throttle 142 into the spring set chamber 143 of the path simulator 116. The outflow of brake fluid is an indicator of the leakage of the redundant seal 140a and can be determined by means of the displacement sensors 133 and 133a, the force of the pedal piston spring 104 and the pressure-volume characteristic of the path simulator 116.

Leakage in the redundant seal 140a can thus be detected during operation without the brake pedal 101 falling through due to this leakage (see also description in FIG. 2). Therefore, this redundancy leads to a hydraulic separation of the working chamber 139 of the path simulator 116 from the spring set 143 of the path simulator 116, which can be referred to as fail operational.

All control and evaluation signals are processed in a control device (not shown). In particular, the sensor evaluation, the diagnosis, the fault evaluation and the fault display are processed. The diagnosis of the seal failures of the redundant seal 140a of the piston path simulator 116, the seal 107 of the auxiliary piston chamber 111 and the redundant seal 127 in the primary chamber 111 of the tandem master brake cylinder 112 (THZ) and the seal 121 in the secondary chamber 122 of the tandem master brake cylinder 112 (THZ), which lead to a leakage flow, takes place via plausibility checks of the pedal path sensor signals 133, 133a with the pedal piston spring 104 taking into account the pressure-volume characteristic of the path simulator 116. Another way of detecting the leakage of a seal that leads to a leakage flow is to correlate the pressure-volume characteristic of the brake system with the volume shift of the pressure supply 146 and the signal of the brake pressure sensor (not shown) in the brake circuit 148. In the brake system of FIG. 4, the leakage flow flows back through each seal into the storage container 131 (VB), except for the redundant seal 140a in the piston path simulator 116 and for the seals of the double-stroke piston in the event that a double-stroke piston as shown in FIG. 3 is used for the pressure supply 146 (see FIG. 3, seals 79 and 80). If the leakage flow does not flow back into the storage container 131 (VB), then a tightness diagnosis is possible by correlating the leakage loss with the signal of a redundant level sensor 151 in the storage container 131 (VB), which is preferably linear.

In the diagnosis, the seal 107a can also be checked for leaks when the brake pedal 101 is not actuated. For this purpose, the diagnosis valve 130, the simulator valve 110, the isolating valve 108 and the shut-off valve 138 are closed, and the isolating valve 109 and the feed valve 144 are opened. The motor 145 is energized with a certain current value and thus brake fluid from the pressure supply 146 via the hydraulic line 147, via the feed valve 144, via the hydraulic line 147a, via the hydraulic line 148, via the isolating valve 109, via the hydraulic line 149 and displaced via the channel 150 into the primary chamber 111 of the THZ 112, wherein the pressure in the primary chamber 111 rises to a certain value, for example 25 bar. The pressure in the hydraulic line 148 is measured by a pressure sensor (not shown). If the seal 107a has a leak, the pressure supply must add brake fluid to keep the pressure in the hydraulic line 148 constant. Leakage of the seal 107a can be detected via the need to supply brake fluid through the pressure supply 146 in order to keep the pressure in the hydraulic line 148 constant.

FIG. 5 shows a brake system which is similar to the brake system of FIG. 4. A significant difference is that in the brake system of FIG. 5, the master brake cylinder 201 (HZ) is divided into three chambers. These are the primary chamber 111, the secondary chamber 122 and the auxiliary piston chamber 204. The secondary piston 119 is located between the primary chamber 111 and the secondary chamber 122. A partition 206 is located between the primary chamber 111 and the auxiliary piston chamber 204. First, the brake system is briefly described.

The brake pedal 101 is actuated by the driver's foot when the driver actuates braking. When the brake pedal 101 is actuated, the pedal tappet 102 and the pedal piston 103 are displaced to the left in FIG. 5. The auxiliary piston 211 and the auxiliary piston plunger 212, which is guided through a bore 213 in the partition 206, are also displaced to the left via the pedal piston spring 104. If the bore 214 of the auxiliary piston 211 has passed the seal 215 during this left displacement of the auxiliary piston 211, then with the isolating valve 216 closed, volume is displaced from the auxiliary piston chamber 204 of the master brake cylinder 201 (HZ) through the channel 217 of the auxiliary piston chamber 204, the hydraulic lines 218 and 114 with throttle 115 and the opened simulator valve 110 and the hydraulic line 114a moved into the working chamber 139 of the path simulator 116. The path simulator piston 117 thereby also moves to the left in FIG. 5 against a spring set 118, as a result of which the pressure in the path simulator 116 and thus also the pressure in the auxiliary piston chamber 204 of the master brake cylinder 201 (HZ) increases.

Corresponding to the displacement path of the pedal piston 103, which is detected by the displacement sensor 133, the motor 228 is energized by a defined volume from the pressure supply 229 via the hydraulic line 147, the opened feed valve 144, the hydraulic line 147a, the primary circuit 233 in the wheel brake cylinders the primary circuit 233 (not shown) and via the channel 150 of the master brake cylinder 201 (HZ) into the primary chamber 111 of the master brake cylinder 201 (HZ). As a result, the pressure in the wheel brake cylinders increases, and the pressure in the primary chamber 111 of the master brake cylinder 201 (HZ) also increases. Due to the pressure in the primary chamber 111 of the master brake cylinder 201 (HZ), the secondary piston 119 is also displaced to the left in FIG. 5, against the force of the secondary piston spring 124. This displacement of the secondary piston 119 displaces brake fluid from the secondary chamber 122 of the master brake cylinder 201 (HZ) through the channel 236 and through the secondary circuit 237 into the wheel brake cylinder of the secondary circuit 237 (not shown). This increases the pressure in the wheel brake cylinders of the secondary circuit 237. If the spring forces of the secondary piston spring 124 are neglected, and if the frictional forces of the seals 127, 125, 121 on the secondary piston 119 are neglected, the pressure in the secondary chamber 122 is equal to the pressure in the primary chamber 111.

There are two seals 241 and 242 in the bore 213 of the partition 206 of the master brake cylinder 201 (HZ). A channel 243 is located between the two seals 241 and 242. This channel 243 is connected via a hydraulic line 244, with a throttle 245 and via a hydraulic line 129a to the storage container 131 (VB). These seals hydraulically separate the primary chamber 111 of the master brake cylinder 201 (HZ) from the auxiliary piston chamber 204 of the master brake cylinder 201 (HZ).

If the seal 241 leaks, for example due to wear or dirt particles, brake fluid can flow out of the primary chamber 111 of the master brake cylinder 201 (HZ) through channel 243, hydraulic line 244 with throttle 245 and hydraulic line 129a into the storage container 247 (VB). The throttle 245 is dimensioned such that the flow from the pressure supply 229 can be compensated for by the leakage of the seal 241. Furthermore, the equalizing flow of the pressure supply 229 is an indicator of the leakage of the seal 241.

Leakage in the seal 241 can thus be detected during operation without the leakage disrupting operation. Therefore, this redundancy of the seals 241 and 242 with the throttle 245 leads to a hydraulic separation of the primary chamber 111 from the auxiliary piston chamber 204 of the master brake cylinder 201 (HZ), which can be referred to as fail operational.

If the seal 242 leaks, for example due to wear or dirt particles, brake fluid can flow from the auxiliary piston chamber 204 of the master brake cylinder 201 (HZ) through the channel 243, through the hydraulic line 244 with the throttle 245 and through the hydraulic line 129a to the storage container 247 (VB). The outflow of brake fluid is an indicator of the leakage of the seal 242 and can be determined by means of the displacement sensors 133 and 133a, the force of the pedal piston spring 104 and the pressure-volume characteristic of the path simulator 116.

Leakage in the seal 242 can thus be detected during operation without the brake pedal 101 failing due to this leakage (see also description in FIG. 2). Therefore, this redundancy of the seals 241 and 242 leads to a hydraulic separation of the auxiliary piston chamber 204 from the storage container 247 (VB), which can be referred to as fail operational.

If the isolating valve 216 leaks, e.g. due to wear or dirt particles, if the brake pressure in the primary circuit 233 is lower than the pressure in the auxiliary piston chamber 204 of the master brake cylinder 201 (HZ), brake fluid from the auxiliary piston chamber 204 through the channel 248, through the hydraulic line 249, through the isolating valve 216 and through the hydraulic line 250 to the primary circuit 233. The brake pedal 101 then falls through. The outflow of brake fluid is an indicator of the leakage of the isolating valve 216 and can be detected by means of the displacement sensors 133 and 133a, the force of the pedal piston spring 104 and the pressure-volume characteristic of the path simulator 116. If the brake pressure in primary circuit 233 is higher than the pressure in auxiliary piston chamber 204, then brake fluid from primary circuit 233 can flow out through the hydraulic line 250 through the isolating valve 216 through the hydraulic line 249 and through the channel 248 into the auxiliary piston chamber 204 of the master brake cylinder 201 (HZ). The brake pedal 101 is then pushed back. The outflow of brake fluid is an indicator of the leakage of the isolating valve 216 and can be determined by means of the displacement sensors 133 and 133a, the force of the pedal piston spring 104 and the pressure-volume characteristic of the path simulator 116. If leakage of the isolating valve 216 is detected, the optional redundant isolating valve 216a (shown in dashed lines) in the hydraulic line 250 is closed. The redundant isolating valve 216a is optional because leakage of the isolating valve 216 is very rare.

Leakage in the isolating valve 216 can thus be detected during operation without the brake pedal 101 falling through due to this leakage. Therefore, this redundancy of the isolating valves 216 and 216a leads to a hydraulic isolation of the auxiliary piston chamber 204 from the primary circuit 233, which can be referred to as fail operational.

As already described in FIG. 4, with the brake system of FIG. 5 all control and evaluation signals are processed in a control device (not shown). Therefore, only the special features of the brake system of FIG. 5 compared to the brake system of FIG. 4 are described at this point.

The diagnosis of the seal failures of the seal 242 of the auxiliary piston plunger 212 and the isolating valve 216, which lead to a leakage flow, takes place via plausibility checks of the pedal path sensor signals 133, 133a with the pedal piston spring 104, taking into account the pressure-volume characteristic of the path simulator 116. Another possibility for detecting the leakage of the redundant seal 127 of the primary chamber 111 of the master brake cylinder 201 (HZ), the seal 121 of the secondary chamber 122 of the master brake cylinder 201 (HZ), the seal 241 of the auxiliary piston plunger 212 and the isolating valve 216, which leads to a leakage flow, consists in correlating the pressure-volume characteristic of the brake system with the volume shift of the pressure supply 229 and the signal of the brake pressure sensor 252 in the primary circuit 233.

In the diagnosis, the isolating valve 216 can also be checked for leaks when the brake pedal 101 is not actuated. For this purpose, the isolating valve 16 is closed, and the optional isolating valve 16a and the diagnosis valve 130 are opened. The motor 228 is energized with a certain current value and thus brake fluid from the pressure supply 229 via the hydraulic line 147, via the isolating valve 144, via the hydraulic line 147a, into the primary circuit 233, and into the wheel brake cylinder (not shown) of the primary circuit 233, and moved via the channel 150 into the primary chamber 111 of the HZ 201, wherein the pressure in the primary circuit 233 rises to a certain value, for example 25 bar. The pressure in the primary circuit 233 is measured by a pressure sensor 252, which is connected to the primary circuit 233 via a hydraulic line 253. If the isolating valve 216 has a leak, then the pressure supply 229 has to supply brake fluid in order to keep the pressure in the primary circuit 233 constant. Leakage of the isolating valve 216 can be detected via the need to supply brake fluid through the pressure supply 229 in order to keep the pressure in the primary circuit 233 constant.

Likewise, in the diagnosis, the optional isolating valve 216a can be additionally checked for leaks when the brake pedal 101 is not actuated. For this purpose, the optional isolating valve 216a is closed, and the isolating valve 216 and the diagnosis valve 130 are opened. The motor 228 is energized with a certain current value and thus brake fluid from the pressure supply 229 via the hydraulic line 147, via the isolating valve 144, via the hydraulic line 147a, into the primary circuit 233, and into the wheel brake cylinders (not shown) of the primary circuit 233, and moved via the channel 150 into the primary chamber 111 of the HZ 201, wherein the pressure in the primary circuit 233 rises to a certain value, for example 25 bar. The pressure in the primary circuit 233 is measured by a pressure sensor 252. If the optional isolating valve 216a has a leak, then the pressure supply 229 must add brake fluid to keep the pressure in the primary circuit 233 constant. Leakage of the optional isolating valve 216a can be detected by the need to supply brake fluid through the pressure supply 229 to maintain the pressure in the primary circuit 233 constant.

FIG. 5a shows a brake system which is similar to the brake system of FIG. 5. An essential difference, however, is that in the brake system of FIG. 5a, the auxiliary piston 211 has no auxiliary piston plunger 212. Likewise, the partition 206 has no bore 213. As a result, there can no longer be a mechanical connection between the auxiliary piston 211 and the secondary piston 119. The two seals 241 and 242 and the channel 243 in the partition 206 are therefore also omitted. Furthermore, the hydraulic line 244 and the throttle 245 are omitted. This also eliminates the possibility of faults such as leakage in the seals 241 and 242 and blockage of the throttle 245. The partition 206 now separates the primary chamber 111 of the master brake cylinder 112 from FIG. 4 into a primary chamber 111 and the auxiliary piston chamber 204 of the master brake cylinder 201 in FIG. 5a.

For a description of the function of the brake system from FIG. 5a, reference is made to the description of the brake system from FIG. 5.

An important difference between the brake system according to FIG. 5 and the brake system according to FIG. 5a relates to the fault case "failure of the brake booster", for example due to the simultaneous failure of the seals 125 and 127 of the master brake cylinder 201. The pressure in the primary chamber 111 and in the primary circuit 233 then remains unpressurized during braking by the driver and cannot be increased by the pressure supply 229, DV1. Since the auxiliary piston plunger 212 is absent, the driver cannot move the secondary piston 119 by means of the auxiliary piston plunger 212 with their foot force on the pedal 101, and the secondary circuit 237 would also remain depressurized. This fault can be remedied by a downstream ESP, 254 using the pressure supply DV2, 255. As soon as the brake system detects the fault, the "active braking" function of the ESP is activated. The ESP increases the pressure in the wheel brake cylinders of the primary circuit 233 and the secondary circuit 237 to a target value, which can be formed, for example, from the signal from the displacement sensor 133 of the pedal piston 103. The ESP, 254 receives the necessary volume of brake fluid in the primary circuit 233, for example through the leaking seals 127 and 125 (FIG. 5a), the channel 136, the hydraulic lines 137 and 137a and the opened shut-off valve 138 (FIG. 4) from the storage container 131. Under the influence of the spring force of the secondary piston spring 124 and the pressure difference between the primary chamber 111 and the secondary chamber 122 of the master brake cylinder 201, the secondary piston 119 is pushed back (to the right in FIG. 5a) to the starting position. In the starting position of the secondary piston 119, there is a direct connection between the secondary chamber 122 and the hydraulic line 137 via the bore of the secondary piston 120 and the channel 136 in the master brake cylinder 112 (FIG. 4). This gives the ESP the necessary volume of brake fluid in the secondary circuit 237, for example through the channels 236 and 136 (FIG. 4), the secondary chamber 122, through the bore of the secondary piston 120, through the hydraulic lines 137 and 137a and the opened solenoid valve 138 (FIG. 4) from the storage container 131.

Another important difference between the brake system according to FIG. 5 and the brake system according to FIG. 5a relates to the fault case "failure of the brake booster," for example due to the failure of the seal in a wheel brake cylinder in the brake circuit 233, for example the wheel brake 516 in FIG. 9a. The pressure in the primary chamber 111 then remains unpressurized during braking by the driver and cannot be increased by the pressure supply 229. Since the auxiliary piston plunger 212 is missing, the driver cannot move the secondary piston 119 by means of the auxiliary piston plunger 212 with their foot force on the pedal 101, and the secondary circuit 237 would also remain depressurized. This fault can be prevented by an isolating valve 144a that is open when without current in the primary circuit 233. As soon as the fault is discovered, the isolating valve 144a is closed. The pressure supply 229 can then displace brake fluid into the primary chamber 111 through the open feed valve 144, through the primary circuit 233 and the channel 150 in the master brake cylinder 201. As a result, the secondary piston 119 is displaced (to the left in FIG. 5a), wherein brake fluid is displaced from the secondary chamber 122 through the channel 236 into the secondary circuit 237. The brake fluid displacement into the secondary circuit 237 increases the pressure in the secondary circuit 237 and thus also the pressure in the wheel cylinders of the wheel brakes (not shown, for example in FIG. 9a 514 and 515) of the secondary circuit 237. The pressure in the primary circuit 233 is measured by the pressure sensor 252 and set to the desired value by the pressure supply 255 of the ESP, 254, wherein the desired pressure is able to be formed, for example, from the signal from the displacement sensor 133 of the pedal piston 103. This fault can also be remedied by a downstream ESP (254). As soon as the brake system detects the fault, the "Active braking" function of the ESP, 254 is activated. The ESP, 254 then increases the pressure in the wheel brake cylinders to a desired value, which can be formed from the signal of the pedal path sensor 133 of the pedal piston 103, by means of the pressure supply 255. However, the ESP, 254 will not be able to increase the pressure in the wheel brake cylinders of brake circuit 233, and there is a risk that the storage container 131 will be sucked empty by the ESP, 254.

Another important difference between the brake system according to FIG. 5 and the brake system according to FIG. 5a relates, for example, to the combination of the fault cases "failure of the seal in a wheel brake cylinder in the brake circuit 233, for example wheel brake 516 in FIG. 9a and failure of the control device of the brake system according to FIG. 5a (not shown) and failure of the control device of the ESP (254)". If the control device of the brake system according to FIG. 5a (not shown) fails, then the isolating valve 216 opens, while the isolating valve 144a remains open. When the driver presses the brake pedal 101, the auxiliary piston 211 moves (to the left in FIG. 5a) and pushes brake fluid out of the auxiliary piston chamber 204 through the channel 248 in the master brake cylinder 201, through the hydraulic line 249, through the opened isolating valve 216 and through the hydraulic line 250 into the primary circuit 233. Due to the failure of the seal in a wheel brake cylinder in the primary circuit 233, for example the wheel brake 516 in FIG. 9a, the primary circuit 233 remains depressurized. Furthermore, due to the failure of the control device of the brake system according to FIG. 5a (not shown), the isolating valve 144a cannot be closed and the primary chamber 111 also remains depressurized. Since the auxiliary piston plunger 212 is missing, the driver cannot move the secondary piston 119 by means of the auxiliary piston plunger 212 with their foot force on the pedal 101, and the secondary circuit 237 would also remain depressurized. Due to the simultaneous failure of the ESP control device (254), ESP (254) cannot increase the pressure in the wheel brake cylinders of the wheel brakes (e.g. 514, 515, 516, 517 in FIG. 9a). This would mean that all wheel brake cylinders of the wheel brakes (for example 514, 515, 516, 517 in FIG. 9a) would remain depressurized during driver braking, and the vehicle would remain unbraked despite driver braking. This situation can be tolerated because the probability of the combination of these fault cases "failure of the seal in a wheel brake cylinder in the brake circuit 233, for example wheel brake 516 in FIG. 9a and failure of the control device of the brake system and failure of the control device of the ESP" is extremely low.

Optionally, a further isolating valve 114b can be provided in the secondary circuit 237, which can be used advantageously, for example, in the ABS control, for example if the pressure supply and the pressure control via the pressure supply 229 take place with the valve 144 open when the ESP fails. For some functions, such as re-feeding, the function of the isolating valves 144a, 144b can also be taken over by the ESP valves, which means that the isolating valves 144a, 144b are not required when in doubt. To do this, the communication interface between the ESP and the booster must be changed. If necessary, a redundant electrical control from the booster can also take effect, for example, for the failure of the ESP.

FIG. 6 shows a brake system which shows a similarity to the brake system of FIG. 5. Differences between the brake systems of FIG. 6 and FIG. 5 do not affect functionality. For a description of the function of the brake system of FIG. 6, reference is therefore made to the description of the function of the brake system of FIG. 5. Substantial changes in the brake system of FIG. 6 compared to the brake system of FIG. 5 concern the seals. These changes in the brake system of FIG. 6 are explained in the following text.

The seal 301 is supplemented by a redundant seal 301a. A channel 302 is located in the master brake cylinder 201 (HZ) between the seal 301 and the redundant seal 301a. A hydraulic line 304 with a throttle 305 is connected to the channel 302 of the master brake cylinder 201 (HZ). The hydraulic line 304 is connected to the storage container 131 (VB). Such a configuration of the seal 301, the redundant seal 301a, the channel 302 and the line 304 with the throttle 305 and the storage container 131 (VB) has already been shown and described in FIG. 2. Therefore, a new description is not provided here. The seal of the secondary chamber 122 to the storage container 131 (VB) can be referred to as fail operational in accordance with the description of FIG. 2.

The seal 328 is supplemented by a redundant seal 329. A channel 330 is located in the master brake cylinder 201 (HZ) between the seal 328 and the redundant seal 329. The channel 330 of the master brake cylinder 201 (HZ) is connected to the throttle 332 via the hydraulic line 331 and to the storage container 131 (VB) via the hydraulic line 322. Such a configuration of the seal 328, the redundant seal 329, the channel 330 and the hydraulic line 331 with the throttle 332 and storage container 131 (VB) has already been shown and described in FIG. 2. Therefore, a new description is not provided here. The seal of the auxiliary piston chamber 204 to the storage container 131 (VB) can be referred to as fail operational in accordance with the description of FIG. 2.

In the illustrated rest position of the brake system, the secondary chamber 122 of the master brake cylinder 201 (HZ) is connected to the storage container 131 (VB) via the bore 120 of the secondary piston 119, via the channel 136 of the master brake cylinder 201 (HZ), via the hydraulic line 311, via the flow check valve 312, via the hydraulic line 313 and via the hydraulic line 304. Via this connection, a downstream ESP device (not shown) can draw in brake fluid from the storage container 131 (VB) via the brake circuit 237 and the channel 236 of the master brake cylinder 201 (HZ). Conversely, a downstream ESP device (not shown) can deliver brake fluid to the storage container 131 (VB) via this connection, via the brake circuit 237 and the channel 236 of the master brake cylinder 201 (HZ). The delivery of brake fluid from the downstream ESP device (not shown) to the storage container 131 (VB) is guaranteed when the flow check valve 312 is open. The flow check valve 312 is open when the volume flow through the flow check valve 312 in the blocking direction (i.e. in the direction of the storage container 131) remains below a defined value. This defined value is expediently greater than the maximum delivery capacity of the return pump of the ESP device (not shown) in the brake circuit 237. The flow check valve 312 should, however, close at larger values of the volume flow than the defined value, so that in the event of larger leaks of the seal 301 and the redundant seal 301a (double fault) the connection is hydraulically separated, and thus the volume loss in the brake circuit 237 is limited.

In the illustrated rest position of the brake system, the auxiliary piston chamber 204 of the master brake cylinder 201 (HZ) is connected to the storage container 131 (VB) via the bore 214 of the auxiliary piston 211, via the channel 255 of the master brake cylinder 201 (HZ), via the hydraulic line 320, via the flow check valve 321 and via the hydraulic line 322. Via this connection, a downstream ESP device (not shown) can suck brake fluid from the storage container 131 (VB) via the primary circuit 233, via the hydraulic line 250, via the open isolating valve 216, via the hydraulic line 249 and via the channel 248 of the master brake cylinder 201 (HZ). Conversely, a downstream ESP device (not shown) can supply brake fluid to the storage container 131 (VB) via this connection and via the primary circuit 233, via the hydraulic line 250, via the open isolating valve 216, via the hydraulic line 249 and via the channel 248 of the master brake cylinder 201 (HZ). The delivery of brake fluid from the downstream ESP device (not shown) to the storage container 131 (VB) is guaranteed when the flow check valve 321 is open. The flow check valve 321 is open when the volume flow through the flow check valve 321 in the blocking direction (i.e. in the direction of the storage container 131) remains below a defined value. This defined value is expediently greater than the maximum delivery capacity of the return pump of the ESP device (not shown) in the primary circuit 233. The flow check valve 321 should, however, close at larger values of the volume flow than the defined value, so that the connection is hydraulically separated in the case of larger leaks in the seal 328, and the volume loss in the primary circuit 233 is thus limited.

As already described in FIG. 5, with the brake system of FIG. 6 all control and evaluation signals are processed in a control device (not shown). Therefore, only the special features of the brake system of FIG. 6 compared to the brake system of FIG. 5 are described at this point. The diagnosis in FIG. 6 of the seal failures of the redundant seal 329 in the auxiliary piston chamber 204 which lead to a leakage flow takes place via plausibility checks of the signals of the pedal path sensors 133, 133a with the pedal piston spring 104 taking into account the pressure-volume characteristic of the path simulator 116. A further possibility for detecting the leakage of the redundant seal 301a of the secondary chamber 122 of the master brake cylinder 201 (HZ) which leads to a leakage flow is to compare the pressure-volume characteristic of the brake system with the volume shift of the pressure supply 229 and the signal of the brake pressure sensor 252 in the primary circuit 233 to correlate.

In the diagnosis, for example, the seal 107a and the flow check valve 321 can be checked for leaks when the brake pedal 101 is not actuated. For this purpose, the simulator valve 334 is closed and the isolating valve 216 is opened. The motor 228 is supplied with a defined value and thus brake fluid is transferred from the pressure supply 229 via the hydraulic line 147, via the opened feed valve 144, via the hydraulic line 147a, via the primary circuit 233, via the hydraulic line 250, via the isolating valve 216, via the hydraulic line 249, via the channel 248 via the auxiliary piston chamber 204 of the master cylinder 201 (HZ), via the bore 214 of the auxiliary piston 211, via the channel 255 of the master cylinder 201 (HZ), via the hydraulic line 320 in the direction of the flow check valve 321. The defined value of the motor current is selected to be so large that the volume flow in the direction of the flow check valve 321 is greater than the defined value at which the flow check valve 321 closes. The flow check valve 321 thus closes. The pressure in the primary circuit 233 is measured by a pressure sensor 252 via a hydraulic line 253. If the seal 107a has a leak, the pressure supply 229 must add brake fluid in order to keep the pressure in the primary circuit 233 constant. Leakage of the seal 107a can be detected by the need to supply brake fluid through the pressure supply 229 in order to keep the pressure in the primary circuit 233 constant.

It also applies that if the flow check valve 321 has a leak, then the pressure supply 229 must add brake fluid in order to keep the pressure in the primary circuit 233 constant. Leakage of the flow check valve 321 can be detected via the need to supply brake fluid through the pressure supply 229 in order to keep the pressure in the primary circuit 233 constant.

FIG. 7 shows a master brake cylinder 401 (HZ) and a piston path simulator 402 from the published patent application DE 10 2013 216 477 A1. The master piston 401 (HZ) contains the primary piston 403 as a stepped piston and the secondary piston 404. The primary piston forms a ring chamber 405 and a primary chamber 406 in the master brake cylinder 401 (HZ). The ring chamber 405 of the primary piston 403 is connected to the working chamber 408 of the piston path simulator 402 via a hydraulic line 407. The secondary piston 404 forms a secondary chamber 409 in the master brake cylinder 401 (HZ). The description of the brake booster function is omitted here. This description is contained in the published patent application DE 10 2013 216 477 A1.

When the brake pedal is not actuated (not shown), the primary chamber 406 of the master brake cylinder 401 (HZ) is hydraulically connected via the bore 410 to the ring chamber 405 of the master brake cylinder 401 (HZ).

When the driver operates the brake pedal (not shown), the pedal tappet 411 is displaced to the left. When the pedal tappet 411 is displaced to the left, the primary piston 403 is also displaced to the left. With the displacement of the primary piston 403 the connection between the primary chamber 406 of the master brake cylinder 401 (HZ) via the bore 410 with the ring chamber 405 of the master brake cylinder 401 (HZ) is separated hydraulically by the seal 412 and brake fluid is displaced from the ring chamber 405 of the master brake cylinder 401 (HZ) via the hydraulic line 407 into the working chamber 408 of the piston path simulator 402. With the displacement of brake fluid into the working chamber 408 of the piston path simulator 402, the piston 413 of the piston path simulator 402 is displaced to the right against a spring 414, wherein the spring 414 is compressed. The force of the spring 414 creates a pressure in the working chamber 408 of the piston path simulator, and thus also a pressure in the ring chamber 405 of the master brake cylinder 401 (HZ). This pressure in the ring chamber 405 of the master brake cylinder 401 (HZ) generates a counterforce on the brake pedal (not shown) that the driver feels when the brake pedal is actuated (not shown). Furthermore, in the connection of the ring chamber 405 of the master brake cylinder 401 (HZ) via the channel 415, via the hydraulic line 416, via the check valve 417, via the hydraulic line 418 and via the hydraulic line 419 to the storage container 131 (VB), the check valve 417 is closed.

Normally, when the driver actuates the brake pedal (not shown), the primary chamber 406 of the master brake cylinder 401 (HZ) is depressurized, which is shown in FIG. 7 by a dashed hydraulic line 421 from the channel 422 in the master brake cylinder 401 (HZ) via the hydraulic line 431 and 419 to the storage container 131 (VB) is symbolized.

Normally, when the driver presses the brake pedal (not shown), the secondary chamber 409 of the master brake cylinder 401 (HZ) is connected to the pressure supply (not shown) via the channel 423, so that the pressure in the secondary chamber 409 of the master brake cylinder 401 (HZ) corresponds to the pressure of the pressure supply. As a result, the secondary piston 404 is normally in contact with the right stop 404a in the master brake cylinder 401 (HZ) when the driver actuates the brake pedal (not shown). Thus, the pressure supply (not shown) can suck brake fluid from the storage container 131 (VB) via the channel 423, via the bore 424, via the secondary chamber 409, via the channel 425, via the hydraulic line 426, via the check valve 427 and via the hydraulic line 428.

The primary chamber 406 of the master brake cylinder 401 (HZ) is hydraulically separated from the secondary chamber 409 of the master brake cylinder 401 (HZ) by the seals 429 and the redundant seal 429a. Between the seal 429 and the redundant seal 429a, there is a channel 430 which is connected to the throttle 432 via the hydraulic line 431 and to the storage container 131 (VB) via the hydraulic line 419.

By connecting the channel 430 in the master brake cylinder 401 (HZ) to the storage container 131 (VB) via the hydraulic line 431 to the throttle 432, via the hydraulic lines 431 and 419, the pressure in the channel 430 is equal to the pressure in the storage container 131 (VB) when height differences between the storage container 131 (VB) and the channel 430 are neglected.

If the pressure in the primary chamber 406 of the master brake cylinder 401 (HZ) is the same as the pressure in the storage container 131 (VB), the seal 429 is not loaded when the redundant seal 429a is intact, because the pressure in the channel 430 also increases the pressure in the storage container 131 (VB), even if the secondary chamber 409 of the master brake cylinder 401 (HZ) is under pressure. Furthermore, if the redundant seal 429a is intact, any dirt particles in the secondary chamber 409 of the master brake cylinder 401 (HZ) are retained by the redundant seal 429a, so that these cannot penetrate into the channel 430 and cannot damage the seal 429. If the redundant seal 429a is intact, the seal 429 does not fail.

If the redundant seal 429a leaks, for example due to wear or dirt particles, brake fluid can flow out of from the secondary chamber 409 of the master brake cylinder 401 (HZ) through the channel 430, through the hydraulic lines 431 with the throttle 432 and through the hydraulic line 419 to the storage container 131 (VB). This outflow of brake fluid can be compensated for by the pressure supply (not shown). The compensation of brake fluid by the pressure supply (not shown) is an indicator of the leakage of the redundant seal 429a and can be determined by means of the motor rotation angle sensor (not shown) of the pressure supply (not shown).

Leakage in the redundant seal 429a can thus be detected during operation without the leakage disrupting the operation. Therefore, the combination of the redundant seal 429a, the seal 429, the channel 430, the hydraulic line 431 with the throttle 432 and the hydraulic line 419 to the storage container 131 (VB) leads to a hydraulic separation of the secondary chamber 409 of the HZ 401 from the primary chamber 406 of the HZ 401, which can be referred to as fail operational.

When the brake pedal (not shown) is actuated, the primary piston 403 is displaced to the left and the bore 410 in the primary piston 403 pushes past the redundant seal 412a. The redundant seal 412a hydraulically separates the ring chamber 405 of the master brake cylinder 401 (HZ) from the primary chamber 406 of the master brake cylinder 401 (HZ).

If the primary piston 403 is displaced further to the left, then the bore 410 in the primary piston 403 may also be displaced past the seal 412. The primary chamber 406 of the master brake cylinder 401 (HZ) is then hydraulically separated from the ring chamber 405 of the master brake cylinder 401 (HZ) by the seal 412 and the redundant seal 412a. Between the seal 412 and the redundant seal 412a there is a channel 433 which is connected to the storage container 131 (VB) via the hydraulic line 419 with the throttle 434. By connecting the channel 433 to the storage container 131 (VB) via the hydraulic line 419, the pressure in the channel 433 is equal to the pressure in the storage container 131 (VB) if differences in height between the storage container 131 (VB) and the channel 433 are neglected.

If the pressure in the primary chamber 406 of the master brake cylinder 401 (HZ) is the same as the pressure in the storage container 131 (VB), the seal 412 is not loaded when the redundant seal 412a is intact, even if the ring chamber 405 of the master brake cylinder 401 (HZ) is under pressure. Furthermore, if the redundant seal 412a is intact, any dirt particles in the ring chamber 405 of the master brake cylinder 401 (HZ) are retained by the redundant seal 412a, so that these cannot penetrate into the channel 433 and cannot damage the seal 412. If the redundant seal 412a is intact, the seal 412 does not fail.

If the redundant seal 412a leaks, for example due to wear or dirt particles, brake fluid can flow out of the ring chamber 405 of the master brake cylinder 401 (HZ) through channel 433, through the hydraulic lines 419 with the throttle 434 to the storage container 131 (VB). This outflow of brake fluid can be compensated for by the driver by reducing the force on the brake pedal (not shown). The brake pedal does not fall through. The braking force compensation is an indicator of the leakage of the redundant seal 412a, and can be determined using the primary piston path sensor (not shown) and the pressure sensor of the piston path simulator (not shown) using the pressure-volume characteristic of the piston path simulator 402.

Leakage in the redundant seal 412a can thus be detected during operation without the leakage disrupting the operation. Therefore, the combination of the redundant seal 412a, the seal 412, the channel 433, the hydraulic line 419 with the throttle 434 to the storage container 131 (VB) leads to a hydraulic separation of the ring chamber 405 of the HZ 401 from the primary chamber 406 of the HZ 401, which can be referred to as fail operational.

The hydraulic separation of the ring chamber 405 of the master brake cylinder 401 (HZ) from the protected chamber 435 of the pedal tappet 411 takes place via the redundant seal 436a and the seal 436. Between the redundant seal 436a and the seal 436 there is a channel 437 in the primary piston 403 with a throttle 438. The pressure in the protected chamber 435 of the pedal tappet 411 is equal to the atmospheric pressure.

Normally, when the driver presses the brake pedal (not shown), the pressure in the ring chamber 405 of the master brake cylinder 401 (HZ) is higher than the atmospheric pressure in the protected chamber 435 of the pedal tappet 411. The pressure in channel 437 of the primary piston 403 is also equal to atmospheric pressure. As a result, the seal 436 is normally not loaded by the driver when the brake pedal (not shown) is actuated and when the redundant seal 436a is intact, even when the ring chamber 405 of the master brake cylinder 401 (HZ) is under pressure. Furthermore, if the redundant seal 436a is intact, any dirt particles in the ring chamber 405 of the master brake cylinder 401 (HZ) are retained by the redundant seal 436a, so that these cannot penetrate into the channel 437 and cannot damage the seal 436. If the redundant seal 436a is intact, the seal 436 does not fail.

If the redundant seal 436a leaks, for example due to wear or dirt particles, brake fluid can flow out of the ring chamber 405 of the master brake cylinder 401 through channel 437 with the throttle 438 in the protected chamber 435 of the pedal tappet 411. This outflow of brake fluid can be compensated for by the driver by reducing the force on the brake pedal (not shown). The brake pedal does not fall through. The brake pedal force compensation is an indicator of the leakage of the redundant seal 436a, and can be determined using the primary piston path sensor (not shown) and the pressure sensor of the piston path simulator 402 (not shown) using the pressure-volume characteristic of the piston path simulator 402.

Leakage in the redundant seal 436a can thus be detected during operation without the leakage disrupting the operation. Therefore, the combination of the redundant seal 436a, the seal 436, the channel 437 with the throttle 438 to the protected chamber 435 of the pedal tappet 411 leads to a hydraulic separation of the ring chamber 405 of the HZ 401 from the protected chamber 435 of the pedal tappet 411, which can be referred to as fail operational.

The hydraulic separation of the working chamber 408 of the piston path simulator 402 from the air-filled spring chamber 439 of the piston path simulator 402 is carried out via the redundant seal 440a and the seal 440. Between the redundant seal 440a and the seal 440 there is a channel 441 in the piston path simulator 402 which is connected to the storage container 131 (VB) via a hydraulic line 442 with the throttle 443, via the hydraulic line 418 and via the hydraulic line 419. The pressure in channel 441 of the piston path simulator is equal to the pressure in the storage container 131 (VB) if differences in height between storage container 131 (VB) and channel 441 are neglected, with atmospheric pressure prevailing in the storage container 131 (VB).

Normally, when the driver actuates the brake pedal (not shown), the pressure in the ring chamber 405 of the master brake cylinder 401 (HZ), and thus the pressure in the working chamber 408 of the piston path simulator 402, is higher than the atmospheric pressure in the spring chamber 439 of the piston path simulator 402. The pressure in the channel 441 of the piston path simulator 402 is also equal to atmospheric pressure. As a result, the seal 440 is normally not loaded by the driver when the brake pedal (not shown) is actuated and when the redundant seal 440a is intact, not even when the working chamber 405 of the piston path simulator 402 is under pressure. Furthermore, if the redundant seal 440a is intact, any dirt particles in the working chamber 408 of the piston path simulator 402 are retained by the redundant seal 440a, so that they cannot penetrate into the channel 441 and cannot damage the seal 440. If the redundant seal 440a is intact, the seal 440 does not fail.

If the seal 440a leaks, for example due to wear or dirt particles, brake fluid can flow from the auxiliary piston chamber 408 of the master brake cylinder 402 through the channel 441, through the hydraulic line 442 with the throttle 443, through the hydraulic line 418 and through the hydraulic line 419 to the storage container 131 (VB). This outflow of brake fluid can be compensated for by the driver by reducing the force on the brake pedal (not shown). The brake pedal (not shown) does not fail. The compensation of the force on the brake pedal (not shown) is an indicator of the leakage of the redundant seal 440a, and can be done by means of the primary piston path sensor (not shown) and the pressure sensor of the piston path simulator 402 (not shown) using the pressure-volume characteristic of the piston path simulator 402 can be determined.

Leakage in the redundant seal 440a can thus be detected during operation without the leakage disrupting the operation. Therefore, the combination of the redundant seal 440a, the seal 440, the channel 441, the hydraulic line 442 with the throttle 443, the hydraulic line 418 and the hydraulic line 419 to the storage container 131 (VB) leads to a hydraulic separation of the working chamber 408 of the piston path simulator 402 from the spring chamber 439 of the piston path simulator 402, which can be referred to as fail operational.

The redundant seal 446a, the channel 447 and the hydraulic line 449 with the throttle 448 are provided for the mechanical fall-back level, for example if the entire vehicle electrical system fails. When the brake pedal (not shown) is actuated, the primary piston 403 is displaced to the left and the bore 410 in the primary piston 403 pushes past the redundant seal 412a. The redundant seal 412a hydraulically separates the ring chamber 405 of the master brake cylinder 401 (HZ) from the primary chamber 406 of the master brake cylinder 401 (HZ).

If the primary piston 403 is displaced further to the left, then the bore 410 in the primary piston 403 may also be displaced past the seal 412. The primary chamber 406 of the master brake cylinder 401 (HZ) is then hydraulically separated from the ring chamber 405 of the master brake cylinder 401 (HZ) by the seal 412 and the redundant seal 412a. In the mechanical fall-back level, the ring chamber 405 is connected directly to the storage container 131 (VB) via hydraulic lines and a solenoid valve (not shown), so that the pressure in the ring chamber 405 does not increase due to the actuation of the brake pedal (not shown). In contrast, in the mechanical fall-back level, the hydraulic line 421 is blocked by a solenoid valve (not shown), so that the pressure in the primary chamber 406 increases when the brake pedal (not shown) is actuated.

In the mechanical fall-back level, the pressure supply (not shown) is not in operation, so that the pressure in the channel 423, and thus the pressure in the secondary chamber 409 of the master brake cylinder 401 (HZ), is not influenced by the pressure supply (not shown). As the pressure in the primary chamber 406 increases, the secondary piston 404 is displaced to the left. If, during this displacement of the secondary piston 404, the bore 424 of the secondary piston 404 is displaced past the redundant seal 446a, then the secondary chamber 409 is hydraulically separated from the channel 447, which via the hydraulic line 449 with throttle 448, via the hydraulic line 431 and over the hydraulic line 419 is connected to the storage container 131 (VB). As a result of this hydraulic separation, the pressure in the secondary chamber, and thus also the pressure in the channel 444, can increase when the secondary piston 404 is displaced further.

If the seal 412 leaks, for example due to wear or dirt particles, brake fluid can flow out of the primary chamber 406 of the master brake cylinder 401 (HZ) through the channel 433, through the hydraulic line 419 with the throttle 434 to the storage container 131 (VB). This outflow of brake fluid can be compensated for by the driver by increasing the displacement of the brake pedal (not shown). The brake pedal does not fall through. If the seal 412 leaks, operation in the mechanical fall-back level is not disrupted by this leakage. Therefore, the combination of the redundant seal 412a, the seal 412, the channel 433, the hydraulic line 419 with the throttle 434 to the storage container 131 (VB) leads to a hydraulic separation of the primary chamber 404 of the HZ 401 from the storage container 131 (VB), which can be called fail operational in the mechanical fall-back level.

If the redundant seal 446a leaks, for example due to wear or dirt particles, brake fluid can drain off from the secondary chamber 409 of the master brake cylinder 401 (HZ) through the channel 447, through the hydraulic line 449 with the throttle 448, through the hydraulic lines 431 and 419 to the storage container 131 (VB). This outflow of brake fluid can be compensated for by the driver by increasing the displacement of the brake pedal (not shown). The brake pedal does not fall through. If the redundant seal 446a leaks, the operation in the mechanical fall-back level is not disrupted by this leakage. Therefore, the combination of the redundant seal 446a, the seal 446, the channel 447, the hydraulic line 449 with the throttle 448, the hydraulic line 431 and the hydraulic line 419 to the storage container 131 (VB) leads to a hydraulic separation of the secondary chamber 409 of the HZ 401 of the storage container 131 (VB), which can be referred to as fail operational in the mechanical fall-back level.

Similarly to as already described in FIG. 4, all control and evaluation signals are processed in a control device (not shown) in the brake system of FIG. 7. Therefore, only the special features of the brake system of FIG. 7 compared to the brake system of FIG. 4 are described at this point. The diagnosis of the seal failures of the redundant seal 412a of the primary chamber 406, the redundant seal 436a of the ring chamber 405 and the redundant seal 440a of the working chamber 408 of the piston path simulator 402, which lead to a leakage flow, is based on plausibility checks of the redundant sensor signals of the primary piston displacement (not shown) with the signal of the pressure sensor (not shown) for the pressure in the working chamber 408 of the piston path simulator 402 taking into account the pressure-volume characteristic of the piston path simulator 402. Another way of detecting the leakage of a seal that leads to a leakage flow is to correlate the pressure-volume characteristic of the brake system with the volume shift of the pressure supply (not shown) and the signal of the redundant brake pressure sensor (not shown) in the brake circuit 444. In the brake system of FIG. 7, the leakage flow flows back through each seal into the storage container 131 (VB), except for the redundant seal 436a of the ring chamber 405 of the master brake cylinder 401 (HZ). If the leakage flow does not flow back into the storage container 131 (VB), then a tightness diagnosis is possible by correlating the leakage loss with the signal of a redundant level sensor 151 in the storage container 131 (VB), which is preferably linear.

FIG. 8 describes how, when braking with a subsequent vehicle stop, the residual pressure in the system at the end of a braking process is used "closed-open-closed" for the diagnosis of the tightness with the corresponding valve switching. The starting point is the assumption that components that were checked for correct function in the diagnosis at the end of a braking process still function correctly under certain conditions in the subsequent braking process. This avoids a separate pre-drive check (PDC), which increases the load cycles, particularly of the seals.

The diagnosis will now be described with reference to the brake system from FIG. 5. In FIG. 8, the brake pressure P in the primary circuit 233, measured by the pressure sensor 252, as a function of the actuation of the brake pedal 101, is given as an example as a solid or dashed curve over the time t. Below this, the signal of the isolating valve 216 (FV) is indicated, wherein the isolating valve 216 (FV) is closed when the signal is 1 and the isolating valve 216 (FV) is open when the signal is 0. Below the signal of the isolating valve 216 (FV) the signal of the driver's door is indicated, wherein the driver's door is closed when the signal is 1 and the driver's door is open when the signal is 0. Below the signal of the driver's door is indicated the signal of the intake valves EV of the wheel brakes (not shown), wherein the intake valves EV of the wheel brakes are closed when the signal is 1 and the intake valves EV of the wheel brakes are open when the signal is 0.

At the time t=0, the braking process is initiated until the vehicle stops. The isolating valve 216 (FV) is closed and the driver's door is closed. The intake valves EV of the wheel brakes (not shown) are open. At the time t=t1, the pressure P in the primary circuit 233 is kept constant and from the time t=t2 the brake pressure in the brake circuit is reduced because the vehicle stop has been reached or is almost reached and the braking process is ended. For diagnosis, the position of the piston of the pressure supply 229 is kept constant in the time range t=t3 to t=t7. If there is no leakage of a seal, then the pressure P in the primary circuit 233 remains constant in the time range D, from t=t3 to t=t6 (solid pressure line). If the pressure P in the primary circuit 233 becomes lower in the time range from t=t3 to t=t4 (dash-dot pressure curve), then there is a leak in a seal, for example the seal 241. If the inlet valves EV of the wheel brakes (not shown) are closed until t=t5 when a seal leaks at time t=t4, and the pressure P in the primary circuit 233 remains constant in the time range from t=t4 to t=t5, then there is a leak on one or more seals of the wheel brakes (not shown) (dashed pressure line). Otherwise there is a leak in the seals in the brake system, e.g. the seal 241. If the isolating valve 216 (FV) is opened in the time range t=t6 to t=t7, then, when the brake pedal 101 is not actuated, brake fluid from the wheel brakes (not shown) flows through the opened inlet valves of the wheel brakes (not shown) through the primary circuit 233, through the hydraulic line 250, through the opened isolating valve 216 (FV), through the hydraulic line 249, through the channel 248, through the auxiliary piston chamber 204, through the auxiliary piston bore 214, through the channel 255, through the hydraulic line 129, through the opened diagnosis valve 218 and through the hydraulic line 129a back into the storage container 131 (VB), wherein the brake pressure P in the primary circuit 233 is reduced. If the isolating valve 216 (FV) is closed again and the pressure P in the primary circuit 233 remains constant, then the isolating valve 216 (FV) is not leaking. Otherwise, if the pressure P in the primary circuit 233 drops further, the isolating valve 16 (FV) is leaking. At the time t=t8 the driver's door is opened and the diagnosis process is terminated. After closing the driver's door at the time t=t9, the diagnosis process can be repeated at the next vehicle stop at the time t=t10.

If it is discovered in the time period from t=t4 to t=t5 that the leak can be attributed to the wheel brakes (not shown), then the EV of a wheel brake can be successively opened briefly in succession. If the pressure P drops again, this wheel brake has a leak, and this wheel brake can then be excluded from braking during the next braking process by the EV of this wheel brake remaining closed during the braking process.

The functions of the isolating valve 216 (FV) open/close and the tightness are important for the "Fail Operational" safety category, since in the event of a fault it may not be possible to use the brake booster function (BKV). The diagnosis described is therefore of great importance. This ensures that there is no volume flow through the valve FV after diagnosis. To ensure this, the following circuits of the isolating valve 216 (FV) are possible:

FV switch-off (open) after diagnosis:
    With ignition off
    With ignition off and driver door closed
    With ignition off with timeout after ignition on
FV activation (close):
    With opening of the vehicle door
    With ignition
    With pre-contact on the brake pedal, so that FV closes before volume is moved over the piston of the master brake cylinder (HZ)

FIG. 9a shows a complete brake system as an extension of the partial brake system of FIG. 5. The extensions mainly relate to redundancy and are now described.

The pressure supply 500 (DV) has two circuits, for example according to the principle of the double-stroke piston DHK (FIG. 3), and supplies the primary circuit 502 via the ring chamber (87, FIG. 3), the hydraulic line 501 and the chamber (86, 3), via the hydraulic line 503, the secondary circuit 504 with brake fluid. Furthermore, the ring chamber (87, FIG. 3) is connected to the chamber 507 (VB1) of the storage container 508 via the hydraulic line 505, with a suction valve 506. The chamber (86, FIG. 3) is connected via the hydraulic line 509 with the suction valve 510 to the chamber 511 (VB2) of the storage container 508. In this way, the primary circuit 502 and the secondary circuit 504 remain hydraulically separated. A leak in the primary circuit 502 thus leads to the failure of the primary circuit 502 but not to the failure of the secondary circuit 504. Conversely, a leak in the secondary circuit 504 leads to the failure of the secondary circuit 504 but not to the failure of the primary circuit 502.

The hydraulic lines 501, 505, or 503 and 509 can also contain solenoid valves (not shown) in order to enable a pressure build-up and a pressure reduction in the primary circuit 502 or in the secondary circuit 504. If the chamber (86, FIG. 5) of the double-stroke piston (87, FIG. 3) fails, then the pressure build-up and the pressure decrease in the secondary circuit 504 via the hydraulic line 503 fails. The pressure build-up and the pressure reduction in the primary circuit 502 via the hydraulic line 503 are still possible. Similarly, if the ring chamber (87, FIG. 5) of the double-stroke piston (FIG. 3) fails, then the pressure build-up and pressure drop in the primary circuit 502 via the hydraulic line 501 fails. The pressure build-up and the pressure reduction in the secondary circuit 504 via the hydraulic line 503 are still possible. A single fault in the pressure supply 500 (DV) therefore does not lead to a failure of the pressure supply 500 (DV).

The motor 512 contains two three-phase windings with two three-phase controls. If a three-phase winding fails, operation of the motor 512 is still possible. The motor also contains a redundant, preferably intrinsically safe, armature angle sensor 513, so that if an armature angle sensor 513 fails, the operation of the motor 512 is still maintained.

The brake circuit division is shown diagonally in FIG. 9a. For example, in a car, the wheel brake 514 is located on the front left wheel and the wheel brake 515 is located on the rear right wheel. In this example, the wheel brake 516 is located on the front right wheel and the wheel brake 517 is located on the rear left wheel.

The valve arrangement for the wheel brakes 514, 515, 516, 517 is intended for the so-called multiplex mode in ABS. For example, if the pressure at wheel brake 514 needs to be reduced during ABS mode, then the valves 519, 520, 521 are closed and the valve 518 is opened. The pressure reduction at the wheel brake 514 then takes place via the piston movement (71, FIG. 3) of the pressure supply 500 (DV). During the pressure reduction on the wheel brake 514, the pressure on the wheel brakes 515, 516, 517 remains constant (retain pressure). Alternatively, the pressure on the wheel brake 514 can also be reduced via the outlet valve 522 and via the hydraulic line 523 to the chamber 511 (VB2) of the storage container 508. This preferably occurs if the pressure is built up in multiplex mode while the pressure is building up on a wheel brake, for example 515 or 516 or 517, while the pressure on the wheel brake 514 has to be reduced.

The wheel brake 516 is connected to the primary circuit 502 via the hydraulic line 524, via the valve 521, via the hydraulic line 525, via the redundant valve 521a, via the hydraulic line 526 and via the hydraulic line 501. For the ABS function, it is sufficient that valve 521 closes when the ABS controller is requested to "retain pressure" on the wheel brake 516, for example with ABS. If the valve 521 leaks, the ABS controller requests to "retain pressure" in the wheel brake 516 by closing the redundant valve 521a. This ensures that if the valve 521 leaks, the transverse stability of the vehicle on the wheel 516 is ensured. The leakage of the valve 521 and the redundant valve 521a can be checked in the diagnosis, as has already been explained with reference to FIG. 5 for the valves 216 and 216a. On the other hand, if the wheel brake 516 leaks, loss of brake fluid can be reliably prevented by closing the valve 521 and the redundant valve 521a.

A valve arrangement similar to that on the wheel brake 516 is provided on the wheel brake 515. The same advantages then apply as on the wheel of the wheel brake 516 for the wheel of the wheel brake 515: Ensuring that the valve 519 leaks, the lateral stability of the vehicle on the wheel 516 is ensured, and ensuring that if the wheel brake 515 leaks, the loss of brake fluid is prevented by closing the valve 519 and the redundant valve 519a.

The storage container 508 is expanded by a third chamber 527 (VB3). Leakage flows through the throttle 528 and 529, which can occur during braking or during diagnosis due to leaks in the seals of the master brake cylinder 201, increase the level of the brake fluid in the third chamber 527 (VB3) and reduce the level of the brake fluid in the chambers 507 (VB1) and 511 (VB2) of the storage container 508. Via the level sensor 530 in the third chamber 527 (VB3) and via the redundant level sensor 151 of the chamber 507 (VB1) and the chamber 511 (VB2) of the storage container 508, this level change in the third chamber 527 (VB3) and in the chamber 507 (VB1) and in the chamber 511 (VB2) of the storage container 508 can be discovered. This results in a further possibility of detecting leaks in the seals of the master brake cylinder 201 (HZ).

Leakage flows through the throttle 142 of the path simulator piston 117 and through the throttle in the piston of the pressure supply (see throttle 82 in FIG. 3) are not returned to the storage container 508. If such leakage flows occur, the level of the brake fluid in the chamber 507 (VB1) and in the chamber 511 (VB2) of the storage container 508 after braking is lower than before braking. This level change can be detected in the chambers 507 (VB1) and 511 (VB2) of the storage container 508 via the redundant level sensor 151. This results in a further possibility of detecting leaks in the seals of the path simulator piston 117 and the double-stroke piston (71, FIG. 3) both after braking and after diagnosis.

The control device 531 (ECU) shows the input and output signals of the sensors, for example the redundant level sensor 151, the motor 512 and the valves, for example solenoid valve 518, and any further input and output signals X as a reserve. The control device 531 (ECU) also shows triple redundancy in the electrical storage devices 532 (U1), 533 (U2) and 534 (U3). The failure of an electrical storage device, e.g. 532 (U1), is handled via the so-called "2 out of 3" rule, which is known from the aircraft industry. The voltages of the electrical storage devices 532 (U1), 533 (U2) and 534 (U3) are compared with one another. If two electrical storage devices show the same voltage, for example 533 (U2) and 534 (U3), while the electrical storage device 532 (U1) shows a different voltage, then the electrical storage device 532 (U1) is detected as faulty and is excluded from the voltage supply. The voltage supply to the control device 531 (ECU) then takes place only via the electrical storage devices 533 (U2) and 534 (U3). A more detailed description of the control device functions can be found in the description of FIG. 9d.

FIG. 9b shows an embodiment of a throttle, for example the throttle 528 in FIG. 9a. The throttle consists of a perforated plate 535 in the hydraulic line, for example 536, to the storage container 508. The perforated plate 535 has at least two holes 537 and 537a, wherein each hole 537 and 537a forms a throttle through which the leakage flow in the hydraulic line 536 flows. If the hole 537 is clogged with dirt particles, the leakage flow through the hydraulic line 536 can still flow through at least one hole 537a. The throttle 528 is therefore redundant. To prevent dirt from getting to the perforated plate, a filter screen 538 is installed in front of the perforated plate in the direction of flow. During braking and also during diagnosis, a leak in the seals in the master brake cylinder 201 (HZ) can also be detected if a hole is blocked, for example 537.

FIG. 9c shows a complete brake system as an extension of the brake system of FIG. 9a. The expansion mainly affects the redundancy of the pressure supply with the drive, and will now be described.

The ring chamber (87, FIG. 3) of the two-circuit pressure supply 500 (DV1) is now connected to the primary circuit 502 via the hydraulic line 501, via the isolating valve 601 and via the hydraulic line 602. The chamber (86, FIG. 3) of the two-circuit pressure supply 500 (DV1) is now connected to the secondary circuit 504 via the hydraulic line 503, via the isolating valve 603 and via the hydraulic line 604. The valve 612 is connected in parallel to the suction valve 506. The pressure in the primary circuit 502 can thus be rapidly reduced via the hydraulic line 602, via the isolating valve 601 and via the hydraulic line 501 and via the valve 612 to the chamber VB2 of the storage container 508. The valve 613 is also connected in parallel to the suction valve 510. The pressure in the secondary circuit 504 can thus be rapidly reduced to the chamber VB1 of the storage container 508 via the hydraulic line 604, via the isolating valve 603 and via the hydraulic line 503 and via the valve 613.

Similar to the pressure supply 500 (DV1) in the redundant pressure supply 605 (DV2), the ring chamber (87, FIG. 3) of the two-circuit pressure supply 605 (DV2) is connected to the primary circuit 502 via the hydraulic line 606, via the isolating valve 607, via the hydraulic line 608 and via the hydraulic line 602. The chamber (86, FIG. 3) of the two-circuit pressure supply 605 (DV2) is now connected to the secondary circuit 504 via the hydraulic line 609, via the isolating valve 610, via the hydraulic line 611 and via the hydraulic line 604.

If the pressure supply 500 (DV1) is intact, the brake force amplification and the ABS pressure modulation take place via the pressure supply 500 (DV1). If the pressure supply 500 (DV1) fails, for example due to a fault in the drive of the double-stroke piston (71, FIG. 3), the isolating valves 601 and 603 are closed and the operation of the pressure supply 500 (DV1) is switched off. The isolating valves 607 and 610 are opened and the operation of the brake system is taken over by the pressure supply 605 (DV2). In this way, a fail operational mode of the brake system is guaranteed, even if the pressure supply 500 (DV1) fails.

FIG. 9d shows the basic concept of a redundant control device (ECU) for the brake systems of FIGS. 9a and 9c. The voltage supply 700 takes place redundantly from the redundant electrical memories U1, U2 and occasionally additionally from U3, comparable to the aircraft technology with the so-called "2 out of 3" selection, as described in FIG. 9a. This voltage supply 700 powers the computers 701 (CP1 to CP3). The output signals of the computers CP1 and CP2 act on the control 702 of, for example, the motor and valves, with the corresponding output stages 703. Here, it is possible to control the motors and valves with double or triple redundancy. However, this means a lot of effort, for example, further valve controls would have to be installed with the ESP 12. Smart redundancy is possible here, in which, as shown in FIG. 9a, only selected valves with redundant control are implemented. It is common for the ESP to permanently monitor the control via lines 704 to the computer CP1 and to the computer CP2. Only the control with the computers CP1, CP2 and CP3 can be designed redundantly. For example, it is known to control a BLCD motor instead of three-phase with two three-phase, on the assumption that the motor mounting and the drive are fail-safe.

It acts on the ECU sensor signals 705 which are passed via the input/output 706 (I/O) to the computers CP1, CP2 and CP3. In a fully redundant brake system according to FIG. 9c, preferably for fully autonomous driving AD (stage 5 of automated driving), it is also conceivable to design the brake system without a tandem master cylinder THZ (not shown). Here the THZ can be replaced by a "brake and go" signal 707, which is generated in the central ECU by the AD.

For the entire computing functions for the processing of the input signals, e.g. from the sensors 705 via the corresponding first I/O 706a and second I/O 706b, one or more powerful computer CPUs, e.g. microcontrollers, are used, which control the actuators, e.g. motors and valves via the corresponding integrated or separate control 702 with output stages 703. The designations 702 and 703 refer to only one symbol, but also apply to the adjacent symbols.

The computers CP1, CP2 and CP3 can be set up redundantly, for example with double redundancy as CP1 and CP2 or triple redundancy as CP1 and CP2 and CP3. Because of the complexity, the computer CP2 can alternatively be used for reduced functions and the computer CP3 for emergency functions of the brake system. Accordingly, this also applies to the actuators and valves. According to FIG. 9a, for the motor, this means that the redundant control for the two-winding combination, i.e. one three-phase redundancy, and for the valves that only one or two valves of one axis are controlled redundantly. Or just the control is redundant and acts on a valve, since the failure rate of the coil of a valve is extremely low.

If only partial functions are fulfilled according to the invention, such as partial function of ABS per axle, a partial redundancy of the valves may be sufficient. In certain cases, such as ESP, this may require a further sensor yaw angle sensor for ESP.

The block diagram shows that all input signals from the sensors 705 and the brake and go signal 706 act on all computers CP1, CP2, CP3. The output signals to the control 702 with the output stages 703 also take place separately from each CP.

With the tendency towards architecture with domains and central computers, it makes sense to design the control separately in an ECU as a slave. The slave ECU then contains the entire control with output stages and possibly I/O for sensors or brake and go switch signals 707. The signal transmission to the master ECU then takes place via redundant bus systems, if necessary in accordance with the above-mentioned computer structure for full function to emergency function with different structure and different protocols.

Because of the low complexity of the slave ECU, costs can be saved by simply unbundling the circuit board with one layer or only a few layers. Due to the high complexity of the functions, neural networks in the software are particularly suitable.

The above advantageous embodiments or configurations describe systems in particular in FIGS. 4 to 9, in particular brake or clutch systems. The solutions according to the invention can advantageously also be used in other hydraulic systems and critical seals of such systems. In this case, individual elements of the invention described above and shown in the drawing, or of its configurations, as well as in other combinations, can also be used advantageously.

LIST OF REFERENCE SYMBOLS

BK1 Primary circuit
BK2 Secondary circuit
D Diagnosis period (t3 to t7)
EV Inlet valve
FV Isolating valve (216)
P Brake pressure in the primary circuit
PDC Pre-drive check
t1 Time when the pressure is kept constant
t2 Time when the pressure is reduced
t3 Time when the pressure for diagnosis is kept constant
t4 Time when the pressure drop is checked and the inlet valves are closed
t5 Time when the inlet valves are opened
t6 Time when the isolating valve FV is opened
t7 Time when the isolating valve FV is closed
t8 Time when the driver's door is opened, diagnosis terminated
t9 Time when the driver's door is closed
t10 Repeat of vehicle stop diagnosis
1 Secondary piston of a brake system
2 Tandem master cylinder (THZ)
3 Primary chamber of the tandem master cylinder
4 Secondary chamber of the tandem master cylinder
5 Channel in the cylinder
6 Hydraulic line
7 Storage container (VB)
8 Cylinder seal
9 Cylinder seal
9a Redundant cylinder seal
10 Channel in the cylinder
11 Hydraulic line
12 Throttle
13 Channel in the cylinder
14 Hydraulic line
15 Channel in the cylinder
16 Hydraulic line
17 Bore in the secondary piston
21 Actuator piston
22 Piston plunger
23 Hydraulic cylinder
24 Working chamber of the hydraulic cylinder
25 Inner chamber of the hydraulic cylinder
26 Force
27 Channel in a cylinder
28 Hydraulic line
41 Primary piston of the tandem master cylinder
41a Plunger
42 Tandem master cylinder (THZ)
43 Primary chamber of the tandem master cylinder
44 Piston plunger chamber
45 Primary piston bore
46 Channel in the cylinder
47 Hydraulic line
48 Seal
49 Seal
49a Redundant seal
50 Channel
51 Hydraulic line
52 Throttle
53 Channel
54 Hydraulic line
71 Stepped piston or double-stroke piston (DHK)
72 Cylinder of the stepped piston
73a Channel in the cylinder
73b Channel in the cylinder
73c Channel in the cylinder
73d Channel in the cylinder
74a Hydraulic line
74b Hydraulic line 74c Hydraulic line
74d Hydraulic line
75a Suction valve
75b Suction valve
75c Check valve
75d Check valve
76 Hydraulic line
78 Channel
79 Seal in the stepped piston
80 Seal in the stepped piston
81 Channel in the stepped piston
81a Channel in the stepped piston
82 Throttle in the stepped piston
83 Seal
84 Seal
85 Throttle
86 Chamber
87 Ring chamber
88 Piston rod
89 Piston rod chamber
101 Brake pedal
102 Pedal tappet
103 Pedal piston
104 Pedal piston spring
105 Primary piston
106 Primary piston bore
107 Seal
108 Isolating valve
109 Isolating valve
110 Simulator valve
111 Primary chamber of the tandem master cylinder
112 Tandem master cylinder (THZ)
113 Channel
114 Hydraulic line
114a Hydraulic line
115 Throttle
116 Path simulator
117 Path simulator piston
118 Spring set of the path simulator
119 Secondary piston
120 Secondary piston bore
121 Seal
122 Secondary chamber of the tandem master cylinder
123 Primary piston spring
124 Secondary piston spring
125 Seal
126 Channel
127 Seal
128 Channel
129 Hydraulic line
129a Hydraulic line
130 Diagnosis valve
131 Storage container (VB)
132 Outer chamber of the tandem master cylinder
133 Path sensor
133a Path sensor
134 Hydraulic line
135 Throttle
136 Channel
137 Hydraulic line
137a Hydraulic line
138 Shut-off valve
139 Working chamber of the path simulator
140 Path simulator piston seal
140a Path simulator piston redundant seal
141 Channel in the path simulator piston
141a Channel in the path simulator piston
142 Throttle in the path simulator piston
143 Chamber of the spring set of the path simulator piston
144 Feed valve
144a Isolating valve, open when without current
144b Isolating valve, open when without current
145 Motor of the pressure supply (DV)
147 Hydraulic line
147a Hydraulic line
148 Hydraulic line
149 Hydraulic line
150 Channel
151 Pedal return spring
201 Master brake cylinder (HZ)
204 Auxiliary piston chamber
206 Partition between the auxiliary piston chamber and the primary chamber
211 Auxiliary piston
212 Auxiliary piston plunger
213 Bore in the partition
214 Auxiliary piston bore
215 Seal
216 Isolating valve
216a Redundant isolating valve
217 Channel
218 Hydraulic line
228 Motor of the pressure supply
229 Pressure supply (DV1)
233 Primary circuit
236 Channel
237 Secondary circuit
241 Seal
242 Seal
243 Channel
244 Hydraulic line
245 Throttle
247 Storage container (VB)
248 Channel
249 Hydraulic line
250 Hydraulic line
252 Pressure sensor in the primary circuit
253 Hydraulic line
254 Electronic stability program (ESP)
255 Pressure supply of the ESP (DV2)
301 Seal
301a Redundant seal
302 Channel
304 Hydraulic line
305 Throttle
311 Hydraulic line
312 Flow check valve
313 Hydraulic line
320 Hydraulic line
321 Flow check valve
322 Hydraulic line
328 Seal
329 Redundant seal
330 Channel
331 Hydraulic line
332 Throttle
334 Simulator valve
401 Master brake cylinder
402 Piston path simulator
403 Primary piston as stepped piston
404 Secondary piston
404a Stop to the right of the secondary piston
405 Ring chamber of the master brake cylinder
406 Primary chamber 407 Hydraulic line
408 Working chamber of the piston path simulator
409 Secondary chamber of the master brake cylinder
410 Bore
411 Pedal tappet
412 Seal
412a Redundant seal
413 Piston of the piston path simulator
414 Spring of the piston path simulator
415 Channel
416 Hydraulic line
417 Check valve
418 Hydraulic line
419 Hydraulic line
421 Symbolic hydraulic line
422 Channel
423 Channel
424 Bore
425 Channel
426 Hydraulic line
427 Check valve
428 Hydraulic line
429 Seal
429a Redundant seal
430 Channel
431 Hydraulic line
432 Throttle
433 Channel
434 Throttle
435 Protected chamber of the pedal tappet
436 Seal in the primary piston
436a Redundant seal in the primary piston
437 Channel
438 Throttle
439 Spring chamber of the piston path simulator
440 Seal
440a Redundant seal
441 Channel
442 Hydraulic line
443 Throttle
444 Channel
446a Redundant seal
447 Channel
448 Throttle
449 Hydraulic line
500 Two-circuit pressure supply (DV, DV1)
501 Hydraulic line
502 Primary circuit
503 Hydraulic line
504 Secondary circuit
505 Hydraulic line
506 Suction valve
507 Chamber in the storage container (VB1)
508 Storage container with three chambers (VB)
509 Hydraulic line
510 Suction valve
511 Chamber in the storage container (VB2)
512 Two three-phase motors
513 Redundant armature angle sensor
514 Front left wheel brake
515 Rear right wheel brake
516 Front right wheel brake
517 Rear left wheel brake
518 Valve
519 Valve
519a Redundant valve
520 Valve
521 Valve
521a Redundant valve
522 Outlet valve
524 Hydraulic line
525 Hydraulic line
526 Hydraulic line
527 Third chamber in the storage container (VB3)
528 Throttle
529 Throttle
530 Level sensor in the third chamber of the storage container
531 Control device (ECU)
532 Redundant electrical storage device (U1)
533 Redundant electrical storage device (U2)
534 Redundant electrical storage device (U3)
535 Perforated plate for the throttle
536 Hydraulic line
537 Hole in the perforated plate
537a Redundant hole in the perforated plate
538 Filter screen of the throttle
601 Isolating valve
602 Hydraulic line
603 Isolating valve
604 Hydraulic line
605 Redundant two-circuit pressure supply (DV2)
606 Hydraulic line
607 Isolating valve
608 Hydraulic line
609 Hydraulic line
610 Isolating valve
611 Hydraulic line
612 Pressure relief valve
613 Pressure relief valve
700 Power supply
701 Computer CP1, CP2, CP3
702 Actuation of motor, valves
703 Output stages
704 Electrical line
705 Sensor signals
706a First input/output (I/O)
706b Second input/output (I/O)
707 Brake and go switch signal

What is claimed is:

1. A piston-cylinder unit, comprising:
a piston which delimits at least one working chamber,
a cylinder,
a first seal arranged to seal at least one first working chamber and disposed either between the piston and cylinder or between a plunger connected to the piston and the cylinder,
a second seal arranged between the first seal and the at least one first working chamber,
a first channel arranged in a wall of the cylinder and disposed between the first seal and the second seal, wherein the first channel and/or a hydraulic line connected to the first channel has a throttle device and/or a valve device, and is connected to or opens into a storage container,
at least one further channel provided in the cylinder, and which opens into an interior of the cylinder and to an essentially pressure-free chamber, wherein the at least one further channel is arranged to be closed by means of movement of the piston or by means of a valve device, and wherein the first seal is arranged on one side of the further channel, and
an electronic control and regulating device with a diagnosis or monitoring function configured to diagnose or monitor a possible defect or failure of a seal, wherein a leakage flow flowing through the first channel is diagnosed or monitored to diagnose a defective seal.

2. A hydraulic device, comprising:
at least one piston-cylinder unit according to claim 1 in which pressure is enabled to be built up by means of movement of the piston in at least one working chamber of the piston-cylinder unit or devices connected to the piston-cylinder unit via hydraulic lines,
an electromechanical pressure supply, including a further piston-cylinder unit,
an electronic control and regulating device, wherein assemblies and/or components of the hydraulic device for fulfilling failsafe criteria are at least partially redundant, and wherein malfunction or failure of one or more of the assemblies and/or components for fulfilling failsafe criteria is diagnosed or monitored by means of a diagnostic or monitoring function of the electronic control and regulating device, wherein for diagnosis or monitoring of the assemblies or components for fulfilling failsafe criteria to detect a malfunction or a failure, plausibility checks are carried out in the electronic control and regulating device, wherein paths of components of an actuating device and a pressure in a piston chamber of the device are used as a basis, and wherein pressure medium is supplied to a brake circuit by means of the piston-cylinder unit via valves, wherein the valves are closed in the event of failure of the brake circuit downstream of the valves after an appropriate plausibility check and wherein the valves are diagnosed at intervals in a test cycle at zero speed during a parking stop.

3. The hydraulic device according to claim 2, wherein a first computing unit is designed to implement reduced functions of the system and a second computing unit is designed for an emergency function of the system.

4. The hydraulic device according to claim 2, wherein the system has a redundant voltage supply, with at least two separate energy stores.

5. The hydraulic device according to claim 2, wherein only selected actuators and/or valves are designed redundantly.

6. The hydraulic device according to claim 5, wherein redundant control of a valve is implemented.

7. The hydraulic device according to claim 2, wherein control of at least one of the components is performed separately in an electronic control and regulating device designed as a "slave," and wherein signal transmission from the "slave" electronic control and regulating device to a "master" electronic control and regulating device takes place via redundant bus systems, with different structures and different protocols.

8. The hydraulic device according to claim 2, wherein in a diagnosis cycle when a vehicle including the hydraulic device is at a standstill, existing or slightly increased brake pressure is used to diagnose tightness of the inlet valves and/or isolating valves assigned to the wheel brakes, and then opening of at least one of the isolating valves is followed by a further diagnosis.

9. The hydraulic device according to claim 2, wherein a path simulator system of the hydraulic device lacks a valve, and wherein a return spring of the piston-cylinder unit takes over a first segment of a characteristic curve of the path simulator, wherein a sniffer hole is disposed on the piston-cylinder unit in an axial direction of the piston-cylinder unit in a location that enables the return spring of the piston-cylinder unit to take over the first segment off the characteristic curve of the path simulator.

10. The piston-cylinder unit according to claim 1, further comprising:
a second seal arranged to hydraulically separate a working chamber of a further piston from a channel of the piston-cylinder unit,
a redundant seal arranged on another side of the channel, with respect to the second seal, and
a solenoid valve arranged in a line leading from the channel to the storage container, wherein the solenoid valve has a dual function in that it closes in the event of a leakage of the first seal detected by means of the monitoring function and during a diagnosis of the redundant seal and the seal of a displacement simulator carried out using the diagnosis function, in which a required test pressure is supplied by a pressure supply.

11. The piston-cylinder unit according to claim 10, wherein in the event of a defect of the redundant seal, an outflow of the hydraulic medium via the defective redundant seal or an equalizing flow is used as an indicator of the leakage of the redundant seal by a leakage flow determined by comparing a pressure-volume characteristic with a volume of a pressure supply.

12. The piston-cylinder unit according to claim 1, further comprising a path simulator having a piston provided with a path simulator seal that separates a working chamber from a spring chamber, with a through channel to the spring chamber, in which through channel a throttle is arranged, and wherein a redundant path simulator seal is arranged on another side of the through channel with respect to the path simulator seal.

13. The piston-cylinder unit according to claim 12, wherein for further leak testing of seals, when an actuating device is not actuated, a working chamber of the piston-cylinder unit is pressurized from a pressure supply, wherein the working chamber is hydraulically closed except for an inflow channel from the pressure supply by means of valves, wherein pressure in the working chamber is increased by means of the pressure supply and a determination is made as to whether the pressure supply needs to add hydraulic fluid to keep the pressure in the working chamber constant.

14. The piston-cylinder unit according to claim 1, wherein for the diagnosis or monitoring of seal failures which lead to a leakage flow, plausibility checks are carried out using an electronic control and regulating device.

15. The piston-cylinder unit according to claim 14, wherein when the plausibility checks are carried out, a path of an actuating device is correlated to pressure in a working chamber and/or a difference between paths of two pedal path sensors, wherein a force-displacement sensor unit with a spring and/or a pressure-volume measurement of the piston-cylinder unit is used.

16. The piston-cylinder unit according to claim 1, wherein a leakage flow occurring at a defective seal is limited, by means of a throttle or a valve arranged in the first channel or in a hydraulic line connected to the first channel, wherein, in the case of the valve, the valve is closed after a leakage flow has been determined.

17. The piston-cylinder unit according to claim 1, wherein a leakage flow occurring at a defective seal is connected, via the first channel or via a line connected to the first channel, to a storage container or to an unpressurized area outside the piston-cylinder unit.

18. The piston-cylinder unit according to claim 1, wherein in the case of a leaking redundant seal, an outflow of hydraulic medium via the leaking redundant seal is compensated for by means of additionally supplied hydraulic medium, by means of a pressure supply device or by actuating an actuating device in a braking device.

19. The piston-cylinder unit according to claim 1, wherein the piston-cylinder unit has a working chamber with a channel to which an electronic stability program (ESP) device is connected, and a channel which is connected to the storage container via a hydraulic line in which a throttle is provided is arranged to draw brake fluid out of the storage container or to supply it to the storage container, and wherein an additional seal is arranged on the channel next to the first seal.

20. The piston-cylinder unit according to claim 1, wherein for diagnosis or monitoring of seal failures that lead to a leakage current, a pressure-volume characteristic is correlated with a volume change of a pressure supply and a signal of a pressure sensor in a pressure circuit.

21. The piston-cylinder unit according to claim 1, wherein there are multiple storage chambers that are provided with redundant level sensors, wherein level changes in the chambers determined by means of the level sensors are used for diagnosing leaks in seals.

22. A piston-cylinder unit in the form of a path simulator, comprising:
a piston which delimits at least one working chamber,
a first seal arranged to seal at least one first working chamber and disposed between the piston and a cylinder of the path simulator,
a second seal arranged between the first seal and the at least one first working chamber,
a first channel of the path simulator which opens, at a first end of the first channel, between the first seal and the second seal, in the inner chamber of the cylinder, wherein the first channel is either:
a) arranged in the cylinder of the path simulator and in hydraulic connection with a storage container, or
b) arranged in the piston of the path simulator, wherein a second end of the first channel connects with a chamber of a spring set of the path simulator, and
an electronic control and regulating device with a diagnosis or monitoring function is provided to diagnose or monitor a possible defect or failure of a seal.

23. The piston-cylinder unit according to claim 22, wherein a throttle is arranged in the first channel.

24. The piston-cylinder unit according to claim 22, further comprising at least one further channel provided in the cylinder, and which opens into an interior of the cylinder and to an essentially pressure-free chamber, wherein the at least one further channel is arranged to be closed by means of movement of the piston or by means of a valve device.

25. A piston-cylinder unit, comprising:
a double-stroke piston and a cylinder, wherein a piston rod of the double-stroke piston is hydraulically sealed from an outer chamber of the cylinder by means of a seal, and wherein a redundant seal is provided for the piston rod,
a channel arranged between the seal and the redundant seal, wherein the channel leads to a storage container, and wherein a throttle is arranged in the channel, and
a further channel in the double-stroke piston, one section of which ends between two further seals and another section of which leads through the piston rod outwards into a piston rod chamber, wherein a throttle is arranged in the further channel.

26. The piston-cylinder unit according to claim 25, wherein the working chambers of the double-stroke piston each comprise an inlet channel and an outlet channel, to which hydraulic lines are connected, in which check valves or switched solenoid valves are arranged, and wherein the lines connected to the inlet channels are connected to a storage container.

* * * * *